US012750248B2

(12) United States Patent
Mako

(10) Patent No.: US 12,750,248 B2
(45) Date of Patent: Sep. 29, 2026

(54) INFORMATION PROCESSING SYSTEM, INFORMATION PROCESSING METHOD, AND PROGRAM

(71) Applicant: PAYCLE Inc., Fukuoka (JP)

(72) Inventor: Yutaka Mako, Fukuoka (JP)

(73) Assignee: PAYCLE INC., Fukuoka (JP)

( * ) Notice: Subject to any disclaimer, the term of this patent is extended or adjusted under 35 U.S.C. 154(b) by 16 days.

(21) Appl. No.: 18/855,114

(22) PCT Filed: Apr. 18, 2023

(86) PCT No.: PCT/JP2023/015499

§ 371 (c)(1),
(2) Date: Oct. 8, 2024

(87) PCT Pub. No.: WO2023/204214

PCT Pub. Date: Oct. 26, 2023

(65) Prior Publication Data

US 2025/0310133 A1 Oct. 2, 2025

(30) Foreign Application Priority Data

Apr. 19, 2022 (JP) ................................ 2022-068599

(51) Int. Cl.
*H04L 9/00* (2022.01)
*H04L 9/08* (2006.01)

(52) U.S. Cl.
CPC .............. *H04L 9/50* (2022.05); *H04L 9/0894* (2013.01)

(58) Field of Classification Search
CPC ....... H04L 9/50; H04L 9/0894; H04L 9/0816; H04L 9/3234; H04L 2209/60; G06Q 50/10
See application file for complete search history.

(56) References Cited

U.S. PATENT DOCUMENTS 11,075,891 B1 * 7/2021 Long .................... H04L 9/3213
11,557,174 B2 * 1/2023 Simons ................ H04L 9/0643
(Continued)

FOREIGN PATENT DOCUMENTS

JP 2008287434 A 11/2008
JP 2020068388 A 4/2020
(Continued)

OTHER PUBLICATIONS

IPO Request for the Submission of an Opinion for corresponding KR Application No. 10-2024-7038366; Issued Apr. 10, 2025.
(Continued)

*Primary Examiner* — Khoi V Le
(74) *Attorney, Agent, or Firm* — CANTOR COLBURN LLP

(57) ABSTRACT

The purpose of the present invention is to improve the convenience of managing rights related to content. An information processing system executes control allowing a client to use content linked to the smart contact on a blockchain while an owner retains ownership of the smart contact. A first control unit executes control to encrypt and store the content using a private key and also save a first key. A second control unit executes control to set content usage rights for a client who has satisfied an authorization to pay a rental fee. A third control unit, upon receiving a content usage request from the client, executes control to transmit the encrypted content to a media player to be operated by the client. A fourth control unit executes control to transmit, for example, a sub-key corresponding to the private key to the media player on the condition of confirming that the client has usage rights.

6 Claims, 29 Drawing Sheets

(56) References Cited

U.S. PATENT DOCUMENTS

| | | | | |
|---|---|---|---|---|
| 2021/0390161 | A1 | 12/2021 | Nakadaira et al. | |
| 2022/0109562 | A1* | 4/2022 | Feola | G06Q 20/389 |
| 2022/0210061 | A1* | 6/2022 | Simu | H04L 9/3239 |
| 2022/0366494 | A1* | 11/2022 | Cella | H04L 9/3231 |

FOREIGN PATENT DOCUMENTS

| | | | |
|---|---|---|---|
| JP | 2021051585 | A | 4/2021 |
| JP | 2021166028 | A | 10/2021 |

OTHER PUBLICATIONS

International Search Report for International Application No. PCT/JP2023/015499; mailed Jul. 18, 2023.

* cited by examiner

INFORMATION PROCESSING SYSTEM, INFORMATION PROCESSING METHOD, AND PROGRAM

CROSS REFERENCE TO RELATED APPLICATIONS

This is the U.S. national stage of application No. PCT/JP2023/015499, filed on Apr. 18, 2023. Priority under 35 U.S.C. § 119 (a) and 35 U.S.C. § 365 (b) is claimed from Japanese Application No. 2022-068599, filed Apr. 19, 2022, the disclosure of which is also incorporated herein by reference.

TECHNICAL FIELD

The present invention relates to an information processing system, an information processing method, and a program.

BACKGROUND ART

Conventionally, a technique for managing the transfer of content using a blockchain has been proposed (for example, see Patent Document 1).

CITATION LIST

Patent Document

Patent Document 1: Japanese Unexamined Patent Application, Publication No. 2021-051585

DISCLOSURE OF THE INVENTION

Problems to be Solved by the Invention

Here, even if there is an arrangement for lending and borrowing between an assignor and an assignee, with only the conventional techniques including Patent Document 1, the situation has been that the ownership managed using a non-fungible token (NFT) on the blockchain is merely transferred, and the assignee has the ownership. Therefore, the assignee who has merely borrowed could arbitrarily transfer the product to another party.

The present invention has been made in view of such circumstances, and an object of the present invention is to improve the convenience of management of rights related to content.

Means for Solving the Problems

An information processing system according to an aspect of the present invention is directed to an information processing system that executes control to allow a client to use a content associated with an NFT with a predetermined tool, while an owner owns the NFT on a blockchain, the system including: a first control unit that encrypts the content using a first key and stores encrypted content in a storage, and stores the first key by a first smart contract on the blockchain; a second control unit that executes control, according to the first smart contract, to set a usage right of the content to the client satisfying a predetermined condition; a third control unit that executes control to extract, when the client requests use of the content, the encrypted content from the storage, and transmit the encrypted content to the predetermined tool operated by the client; and a fourth control unit that executes control, according to the first smart contract, to transmit the first key to the predetermined tool operated by the client when it is confirmed that the client has the usage right.

An information processing method and a program according to an aspect of the present invention is directed to an information processing method and a program corresponding to the information processing system according to the abovementioned aspect of the present invention.

Effects of the Invention

According to the present invention, it is possible to improve convenience of management of rights related to content.

PREFERRED MODE FOR CARRYING OUT THE INVENTION

Figure 1:
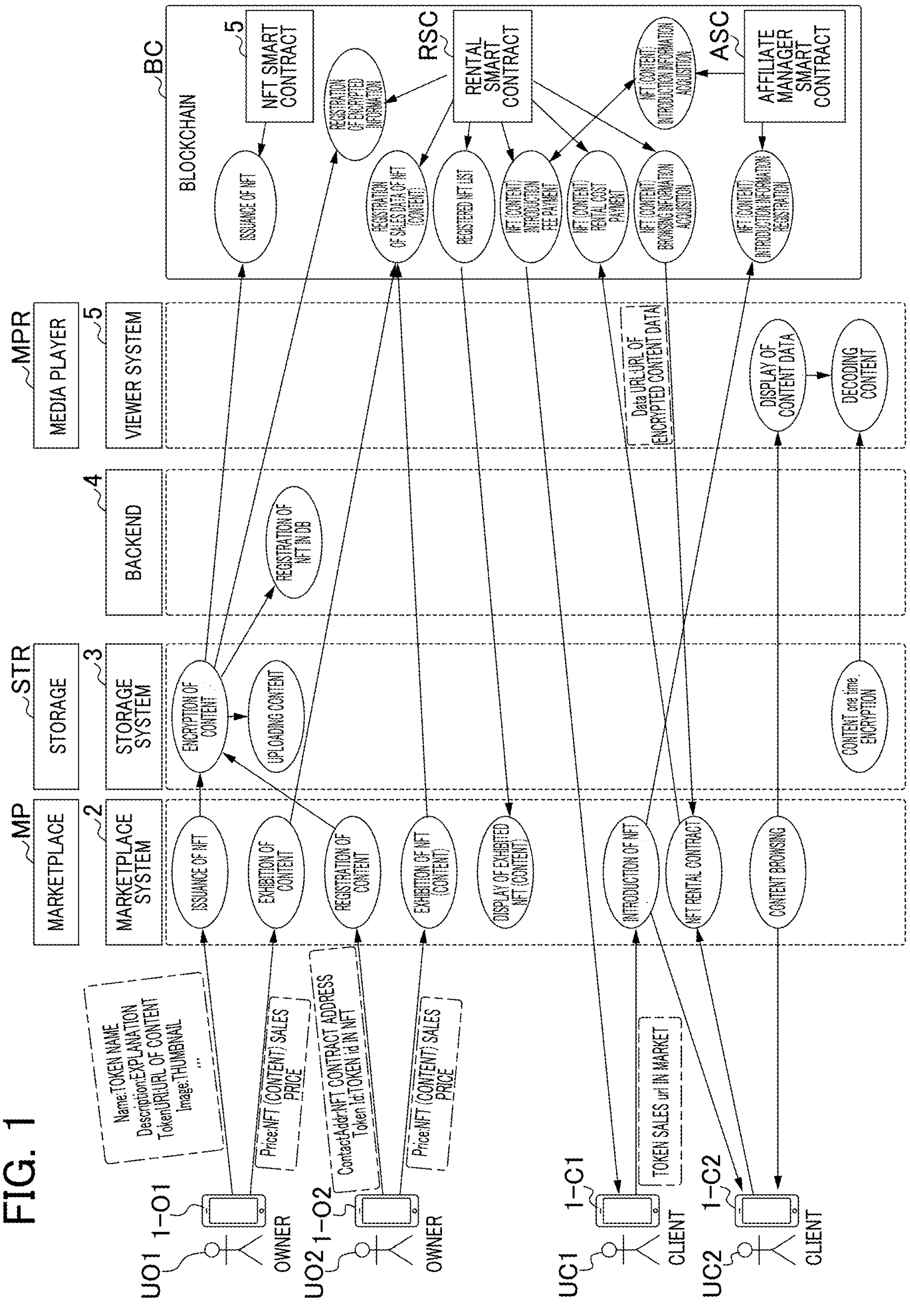
FIG. 1 is an image diagram showing an outline of the flow of the present service to which an embodiment of the information processing system of the present invention is applied.

First, before describing embodiments of an information processing system of the present invention, an outline of a service (hereinafter, referred to as "present service") to which the embodiments of the information processing system are applied will be described.

The present service refers to a service provided by a marketplace and the business related to marketplace capable of renting digital content associated with an NFT (giving permission to use digital content), and also refers to a service using a tool (an information processing system) utilizing the technology of a Smart Contract and an NFT of a blockchain. The Smart Contract is similar to a program that is embedded in a blockchain and executed according to a preset rule. Accordingly, the descriptions such as "Smart Contract does . . . ", "done by Smart Contract . . . ", "done from Smart Contract", and the like indicate "processing is executed according to the rules set in the Smart Contract".

Here, the difference between the conventional NFT rental services and the present service will be described.

The present service refers to a service that permits use of digital content (display, reproduction, viewing, etc.) using a specific key using the NFT (a key created using the NFT). In the present service, the owner (creator or purchaser) of the NFT can provide (sell or the like) only the usage right of the digital content associated with the NFT without releasing the ownership of the NFT.

On the contrary, conventional NFT rental services refer to services in which an owner of an NFT (hereinafter referred to as an "owner") literally lends the NFT itself to a third party who wants to use the NFT itself (hereinafter referred to as a "client"). A general mechanism of the conventional NFT rental services is as follows. That is, in order to borrow the NFT, the client needs to set a collateral fee and pay a rental fee.

As a specific example of the conventional NFT rental services, when a client UC attempts to rent an NFTB from the owner A, the client UC needs to send the collateral fee and the rental fee defined by the owner A to an escrow account (Smart Contract) of the NFT rental service company. The collateral fee is a guarantee received by the owner A in the case of the NFTB not being returned from the client UC to the owner A. The conventional NFT rental services are determined to be effective to some extent in GameFi (online game) or the like. In the conventional NFT rental in GameFi, an item (digital content) created and promoted by a user E in an online game D is converted into an NFT, and the user E rents the NFT to another user F as the owner A. The online game D and the blockchain are linked, and the users of the online game D cannot use (manipulate or display) a specific item unless the users possess the NFT. For example, it is assumed that the user E spends time and incurs cost to create an item G as a special character. That is, it is assumed that the user E is the owner A who is an owner of the NFT of the item G. In this case, even if the client UC, who is another user who has found the item G in the marketplace of the online game D, wants to use the item G, the client UC cannot use the item G because the client UC does not have the ownership of the NFT of the item G. In such a case, the client UC can use the item G by renting the NFT of the item G from the user E.

The important point here is that, in the conventional NFT rental, the NFT itself is moved from the wallet address of the owner A (such as an account of the blockchain) to the wallet address of the client UC. In this regard, a first problem with a very high risk arises. For example, when the client UC does not want to return the rented NFT to the owner A from the beginning, the following risk occurs. That is, the client UC may not have an intention to return the NFT when the client UC expects that the online game D is more popular in the future and the value of the item G in the online game D increases. In other words, when the client UC determines that the value of the item G exceeds the collateral fee even if paying the collateral fee to the owner A, the client UC may refuse to return the NFT of the item G to the owner A. When the client UC cannot access its own wallet address for some reason, it is impossible to return the NFT of the item G (execute the transaction). In any case, as a result, the owner A loses the NFT of the item G which the owner A is not willing to release. Thus, in the conventional NFT rental, there is a risk that the owner A loses their own NFT. Further, this risk is affected not only by the above-described maliciousness or fault of the client UC, but also by the maliciousness or fault of the conventional NFT rental service companies. In general, the conventional NFT rental is performed by mediating a service company (via transmission of collateral fee, usage fee, and NFT). Therefore, there is a possibility that the owner A loses the NFT of the item G due to the management structure of the service company.

Further, since the business model of the conventional NFT rental is very centralized, a second problem arises in that only one person can use the NFT and the digital content during the rental period (in the above example, only the client UC can use the NFT and the item G). Since only one NFT is available, it is impossible for a plurality of people to use the NFT at the same time. In the case of digital content such as GameFi or ultra-high-value (high-price) digital art, it is considered that there is no problem or it is ideal for only one user during a certain period of time. However, the conventional NFT rental, which only one user can use, is unsuitable for digital content such as music, moving images (films, short films, etc.), electronic books, or items that are desired to be used simultaneously in a plurality of metaverses.

According to the present service, as described above, it is possible for the owner of the NFT to provide (sell or the like) only the usage right of the digital content associated with the NFT to the client without releasing the ownership of the NFT. Therefore, it is possible for the present service to solve the first problem and the second problem of the conventional NFT rental. That is, in the present service, since not only one client, but also a plurality of clients, can use the digital content associated with the NFT while the owner has ownership of the NFT during a specific period. Therefore, the present service is superior to the conventional NFT rental. Further, the dedicated tool provided by the present service has various functions for preventing unauthorized use.

Reference will now be made to the terms used in the present services and the drawings. "NFT Smart Contract" is a Smart Contract that issues an NFT in a blockchain (or Ethereum). Here, Ethereum is a registered trademark. In addition, in the following description, the blockchain (or Ethereum) is simply abbreviated as "blockchain". Every time an NFT is issued, the information is registered as a token in the blockchain. "Non-Fungible Token (or ERC-721)" is an NFT issued on a blockchain. "Token: id #1" is an NFT issued by a certain person (issuer A) and information registered in the NFT. The owner of the NFT becomes issuer A. "Token: id #2" is an NFT issued by issuer A or another person (issuer B) and information registered in the NFT. The owner of the NFT will be issuer A or issuer B. "Token: id #3" is an NFT issued by issuer A, issuer B, or another person (issuer C), and information registered in the NFT. The owner of the NFT will be issuer A, issuer B, or issuer C. "Public" indicates that all people can browse. "Title" is the title of the digital content for which the NFT has been issued. "Description" is a description of the content for which the NFT is issued. The "token URI" is URI (Uniform Resource Identifier) information of a token (Token). URI is a generic term for rules for writing to identify the name or location of a target file. "Functions" is a mathematical function used in the present service in the function of the NFT Smart Contract. "Rental Smart Contract" is a Smart Contract for a rental contract created to realize the present service in the blockchain. The "Token for Payment (or ERC-20)" is a token (Token) for paying the rental fee, that is, a cryptographic asset (virtual currency) for paying the rental fee when the rental contract is executed in the present service. "Ownerable" is an interface for performing authority management in a Smart Contract. "Ownerable" is a kind of template, and is capable of delegating to a third party a remittance authority of Token enabled by signing with a private key, thereby enabling remittance. "tokenStatus[tokenId][address]" is a Smart Contract created and added every time a rental contract is established. "tokenStatus[#1][user1]" is linked with "Token: id #1" of the Non-Fungible Token (or ERC-721), and [user1] indicates a person who executes a rental contract (a borrower). "NFT_approved" is an item for confirming whether the person who executes a rental contract (a borrower) is authorized to browse the dataURL of the NFT Token (or ERC-721). "key_approved" is an item for confirming whether the person who executes a rental contract (a borrower) is authorized to acquire a public key (Pk2) for decoding content data. "rental start time" is the start date of the rental contract. "rental_end_time" is the end date of the rental contract. "tokenInfo[tokenId]" is information related to Non-Fungible Token (or ERC-721) to be a target of a rental contract. "tokenInfo[tokenId]" is linked with "Token: id #1" of Non-Fungible Token (or ERC-721). "Protected" indicates that only authorized persons (rental contractors) can browse. "Private" indicates that only the owner of Non-Fungible Token (or ERC-721) can browse. "Price" is a rental amount. "is-approved" is information as to whether the relevant Non-Fungible Token (or ERC-721) can make a rental contract. "dataURL" is URL information of content. "Encrypt Main Key (P1)" is information of a private key used in this service. "Encrypt Sub Key (Pk1)" is information of a public key used in this service. "approve limit" is the number of rental contracts that can be made at the same time.

Hereinafter, an outline of the present service will be described with reference to FIGS. 1 to FIG. 11. FIG. 1 is an image diagram showing an outline of the flow of the present service to which an embodiment of the information processing system of the present invention is applied.

Figure 2:
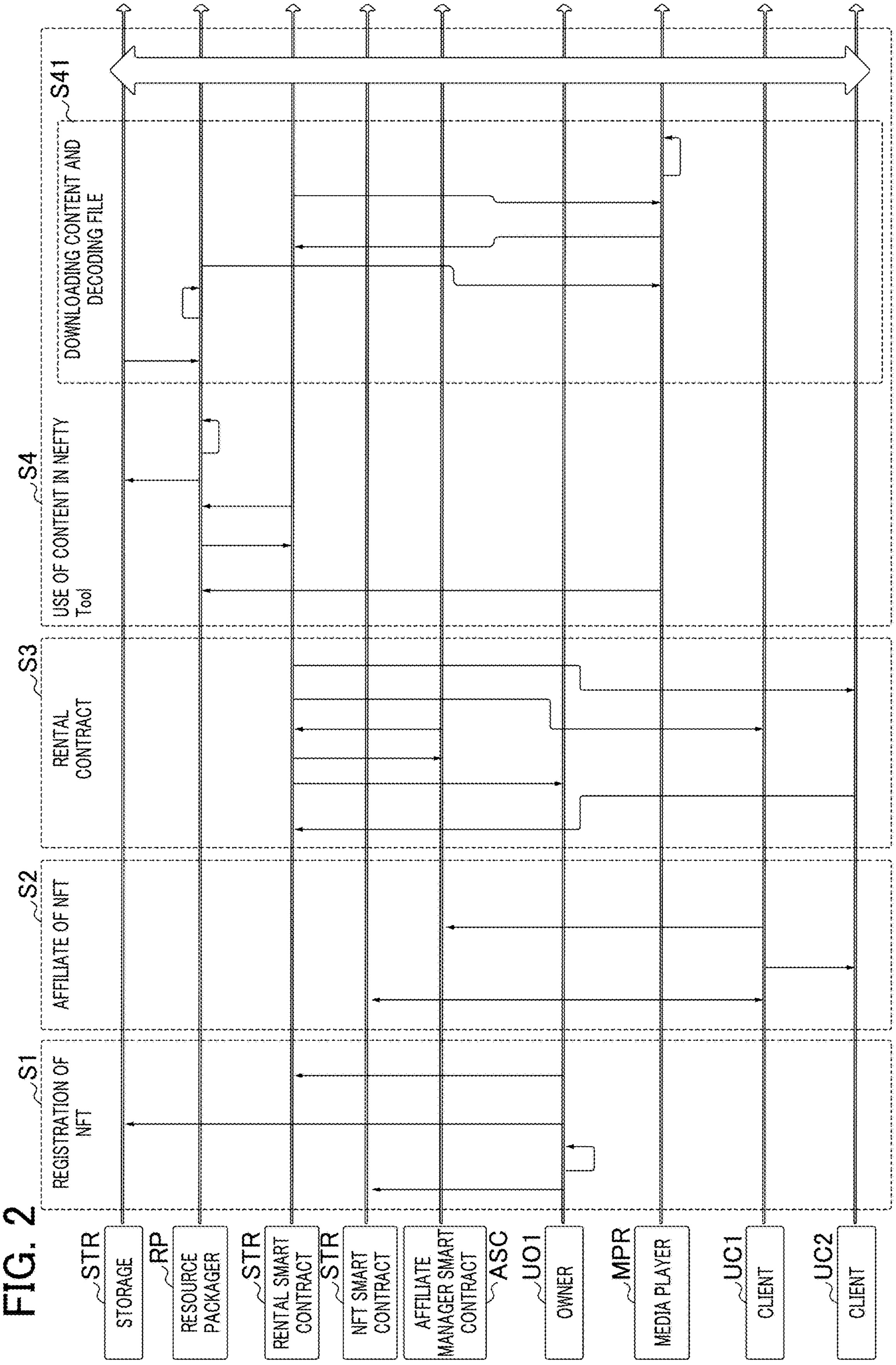
FIG. 2 is a sequence chart illustrating the flow of the present service for an owner who issues an NFT of digital content, a first client who rents the digital content, and a second client who rents the digital content in response to an introduction from the first client among the users in FIG. 1.
Figure 3:
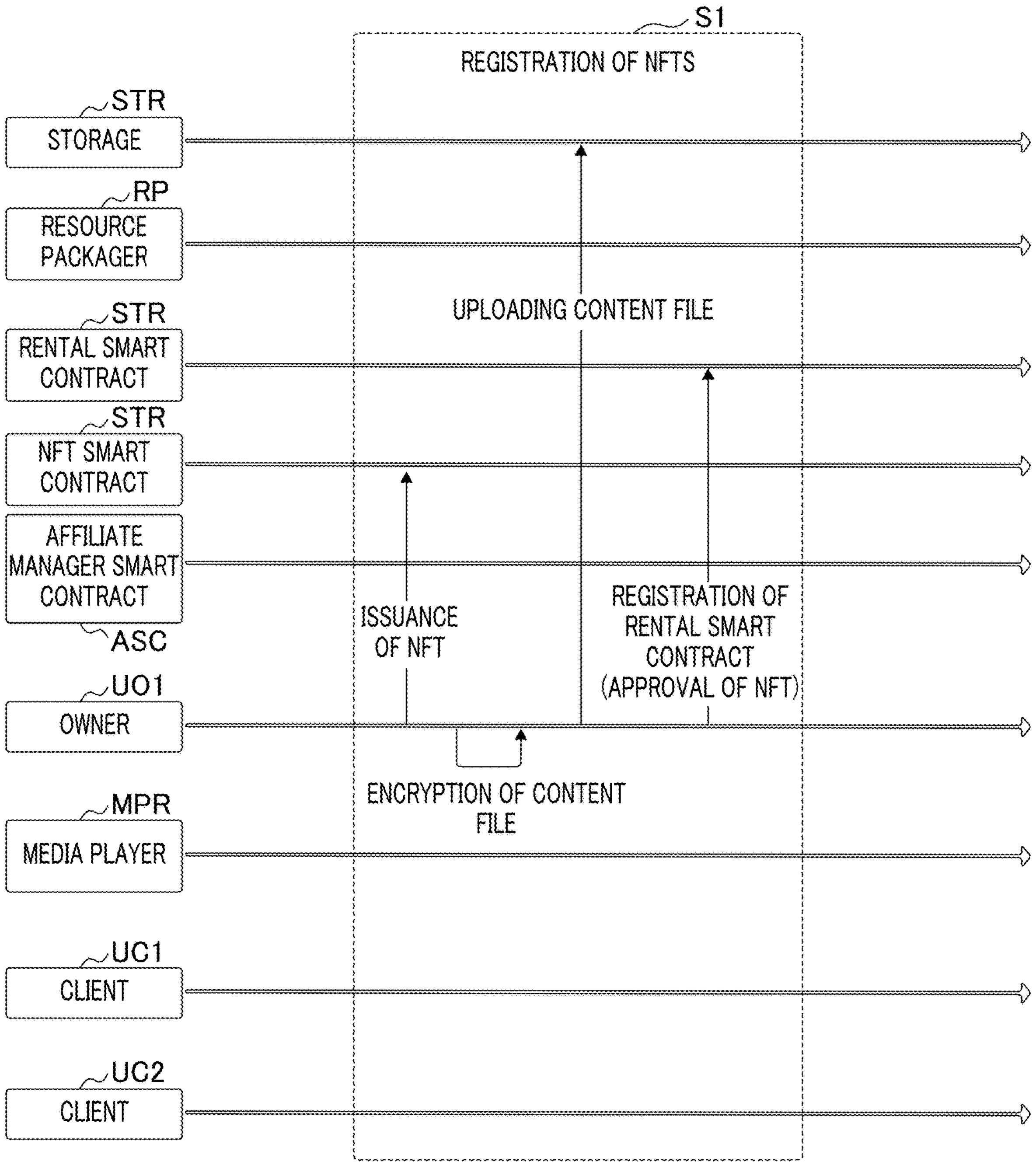
FIG. 3 is an enlarged view of the NFT registration in step S1 of FIG. 2.
Figure 4:
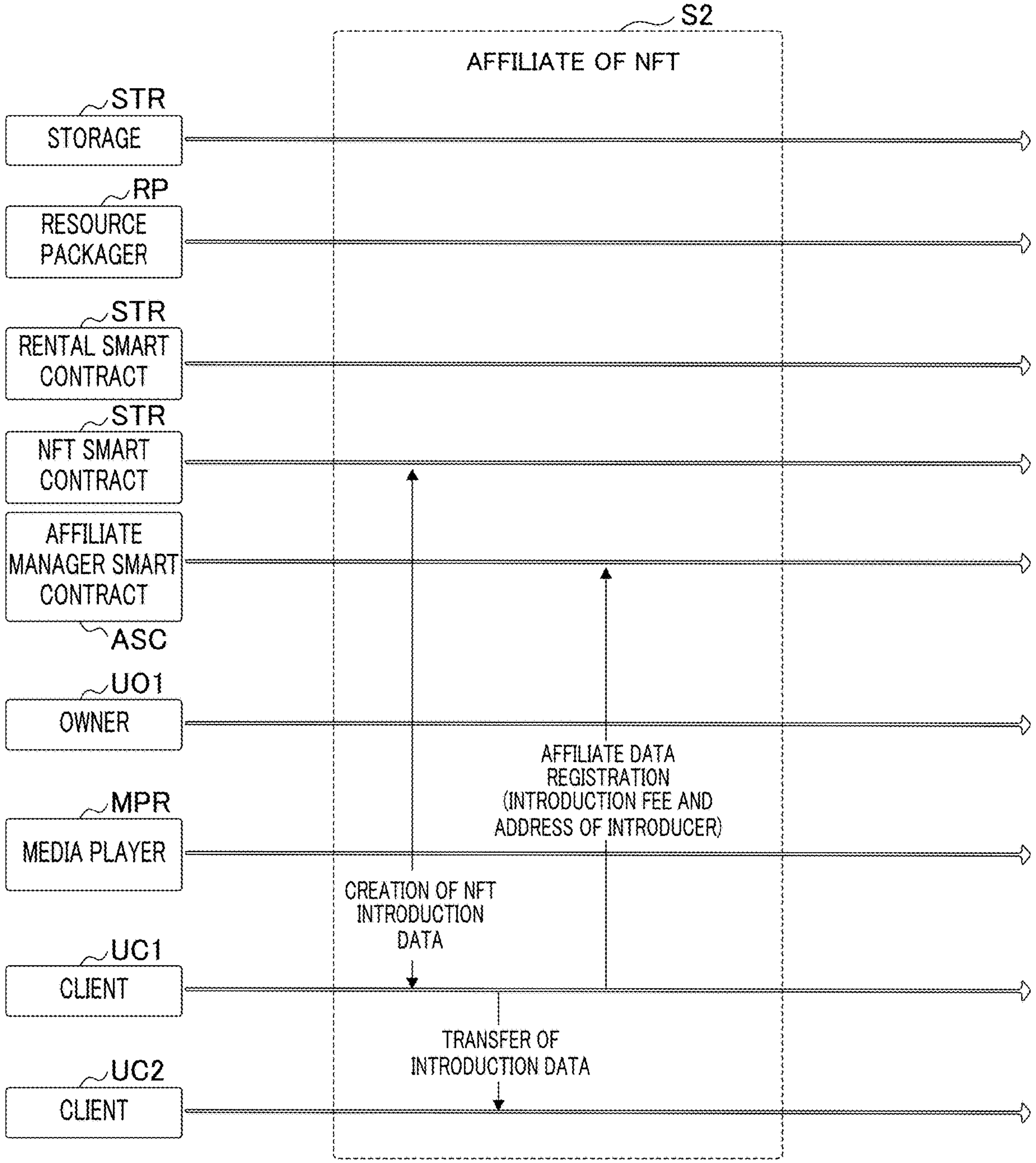
FIG. 4 is an enlarged view of an affiliate of the NFT in step S2 of FIG. 2.
Figure 5:
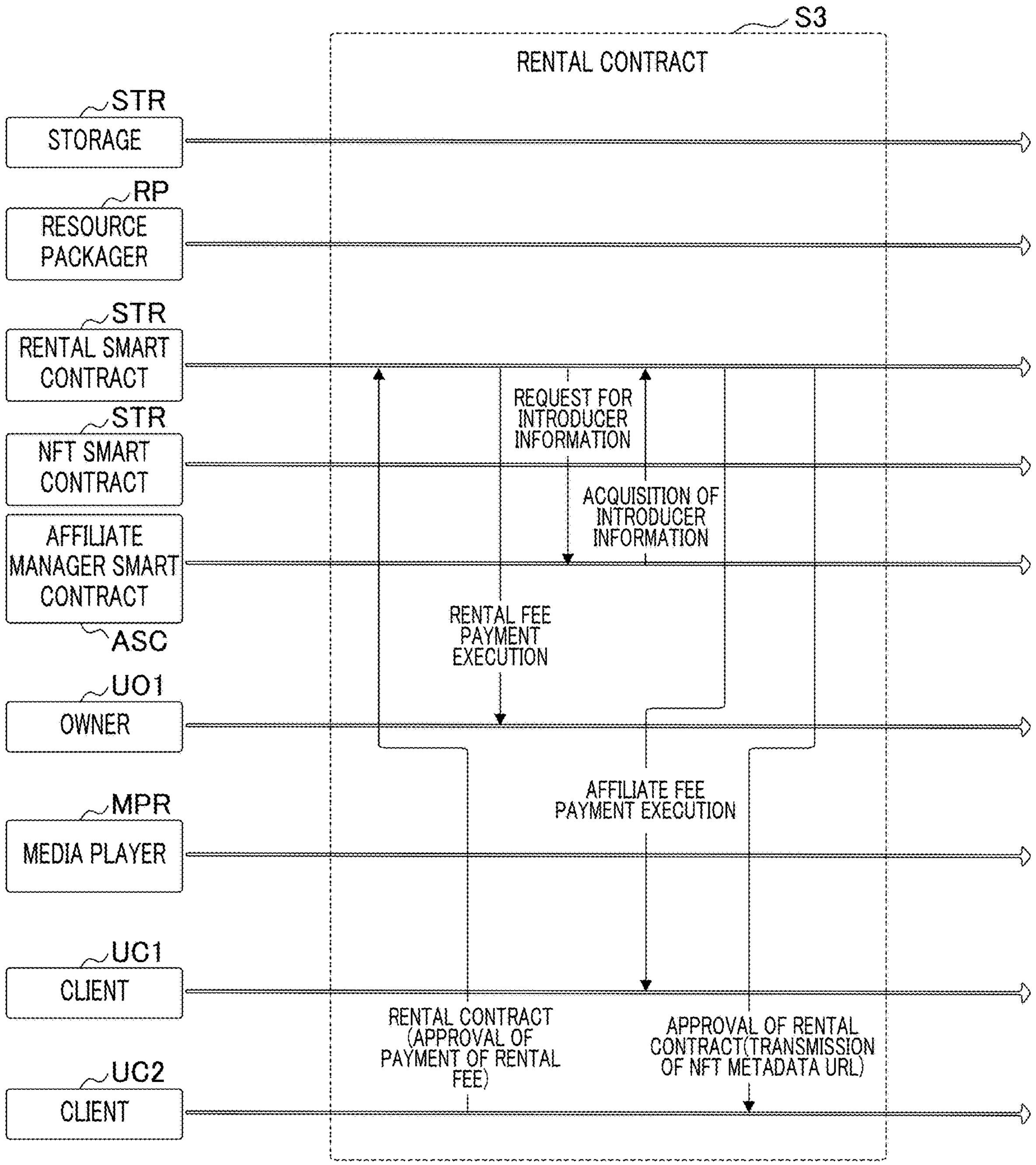
FIG. 5 is an enlarged view of the rental contract in step S3 of FIG. 2.
Figure 6:
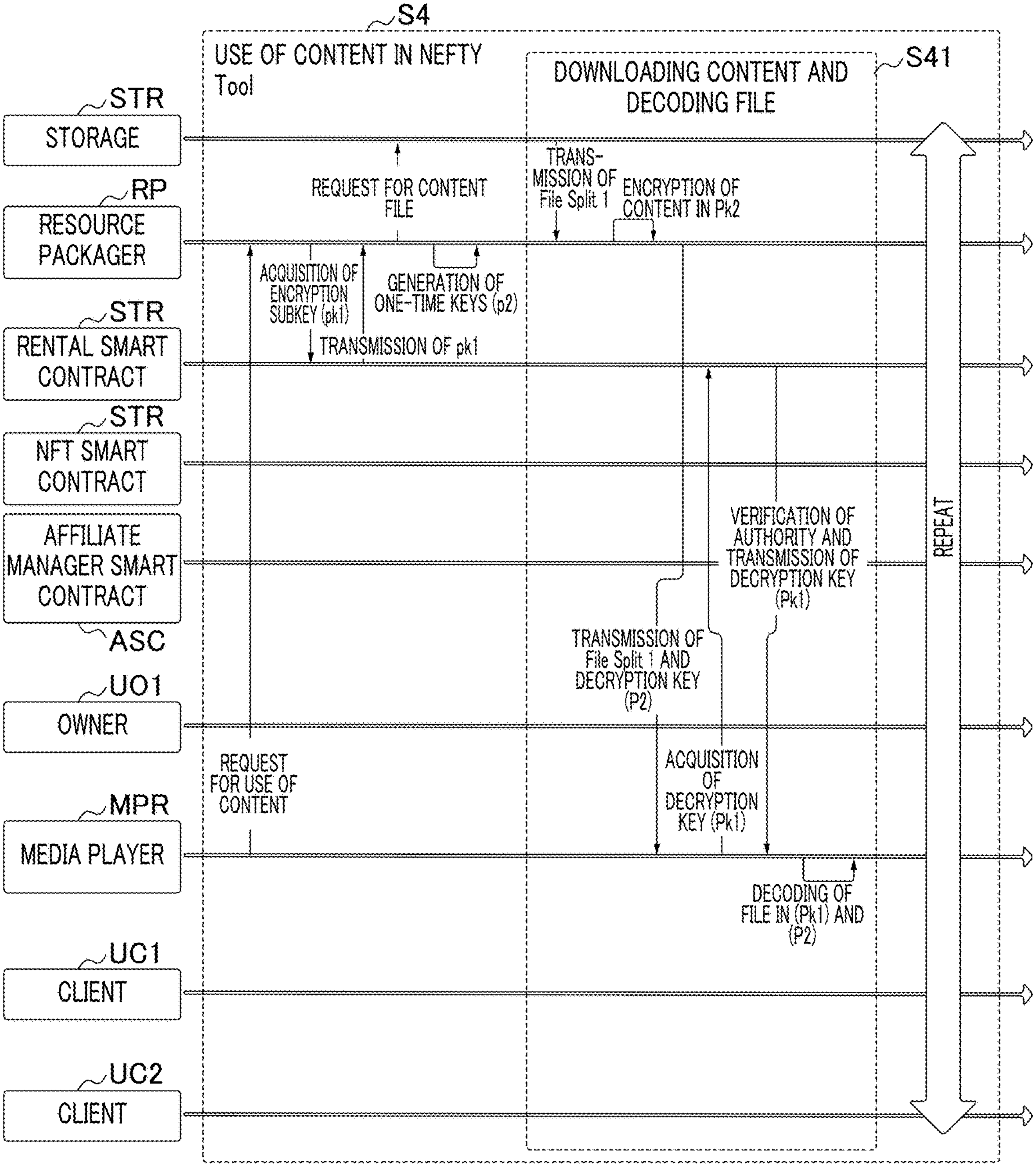
FIG. 6 is an enlarged view of usage of content in NEFTY TOOL in step S4 of FIG. 2.

FIG. 2 is a sequence chart illustrating the flow of the present service for an owner who issues an NFT of digital content, a first client who rents the digital content, and a second client who rents the digital content in response to an introduction from the first client among the users in FIG. 1. FIG. 3 is an enlarged view of the NFT registration in step S1 of FIG. 2. FIG. 4 is an enlarged view of an affiliate of the NFT in step S2 of FIG. 2. FIG. 5 is an enlarged view of the rental contract in step S3 of FIG. 2. FIG. 6 is an enlarged view of usage of content in NEFTY TOOL in step S4 of FIG. 2.

Figure 7:
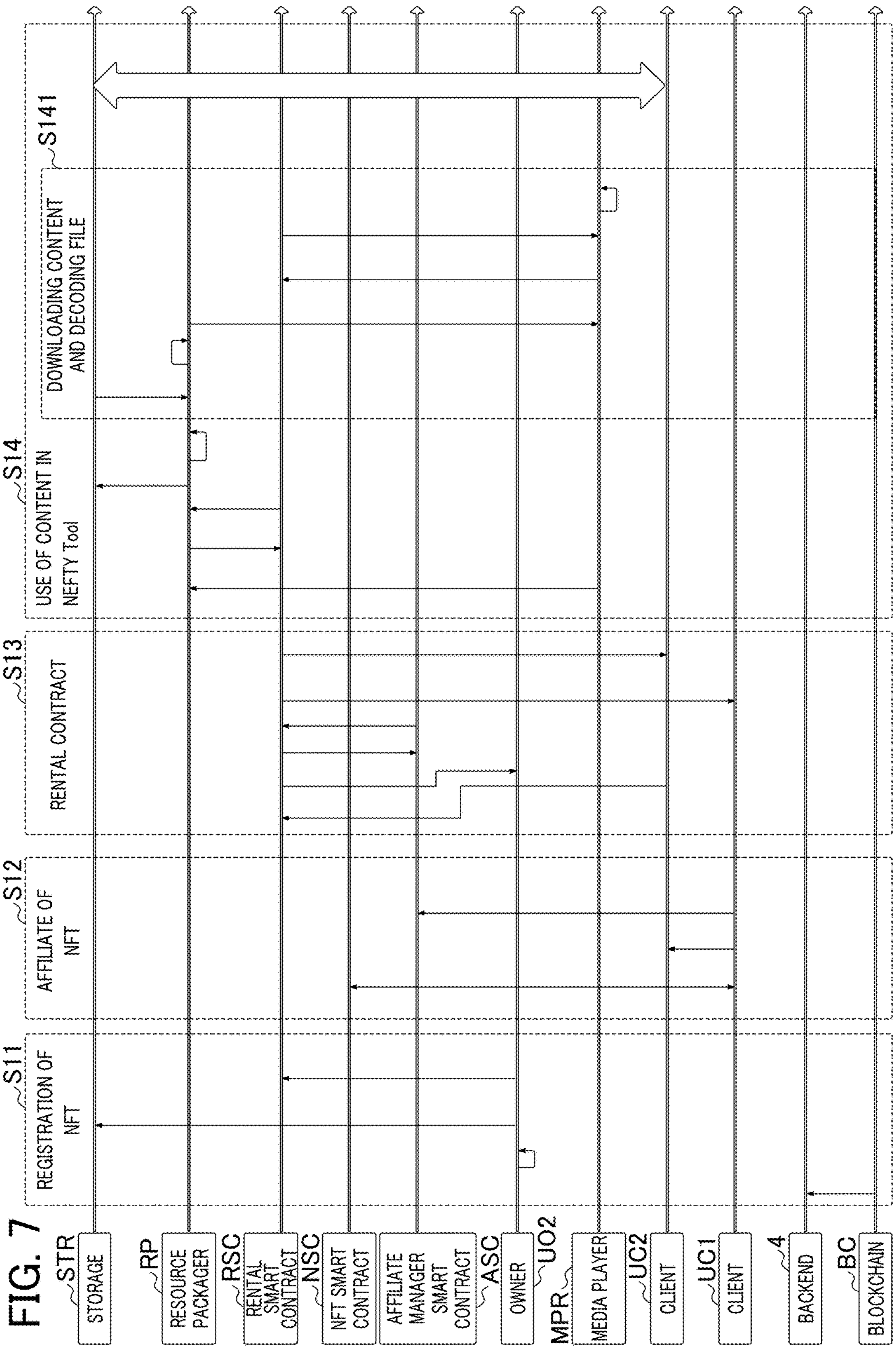
FIG. 7 is a sequence chart illustrating the flow of the present service for an owner who registers digital content for which the NFT has been issued, a first client who rents the digital content, and a second client who rents the digital content in response to an introduction from the first client among the users in FIG. 1.
Figure 8:
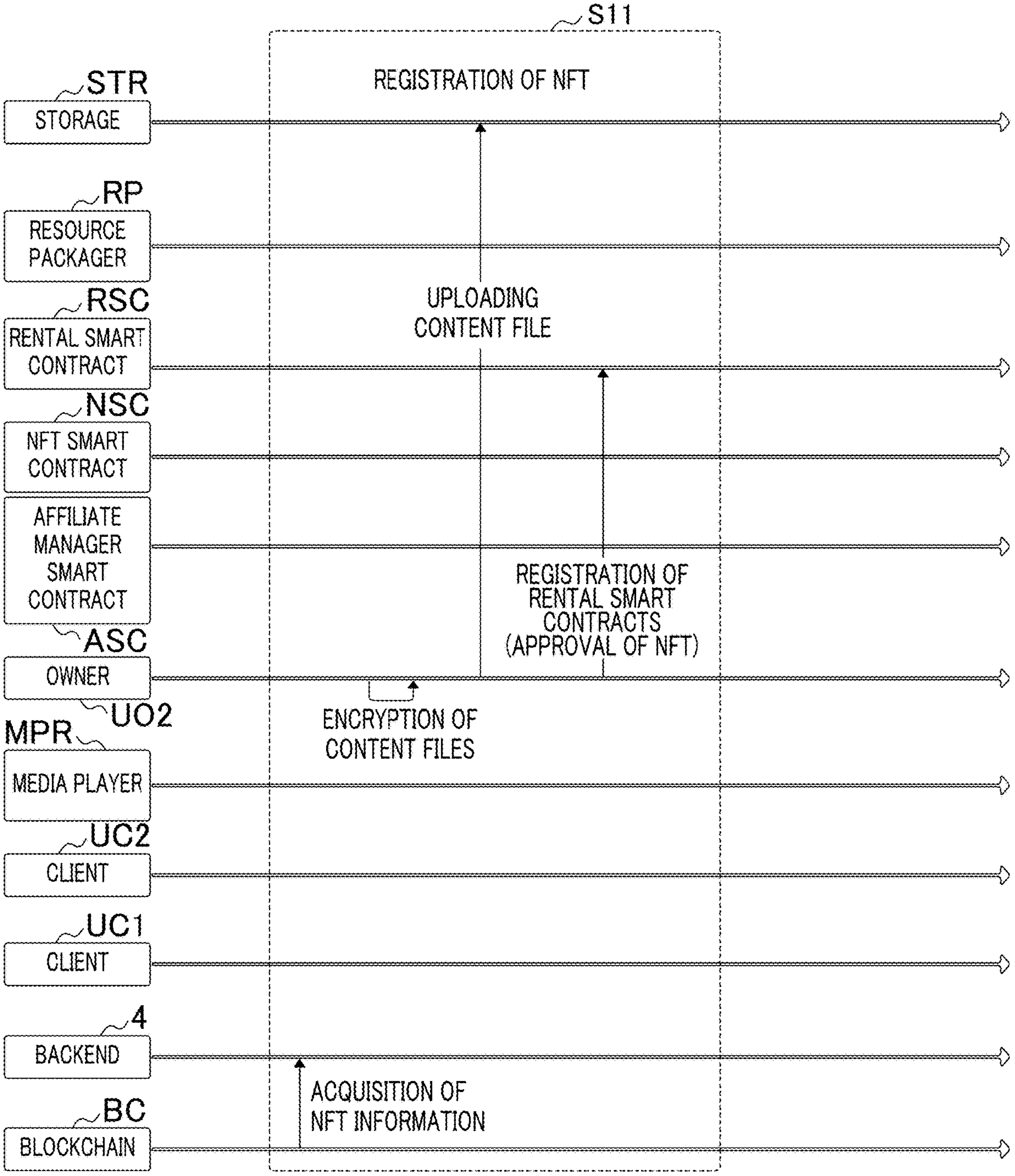
FIG. 8 is an enlarged view of the NFT registration in step S1 of FIG. 2.
Figure 9:
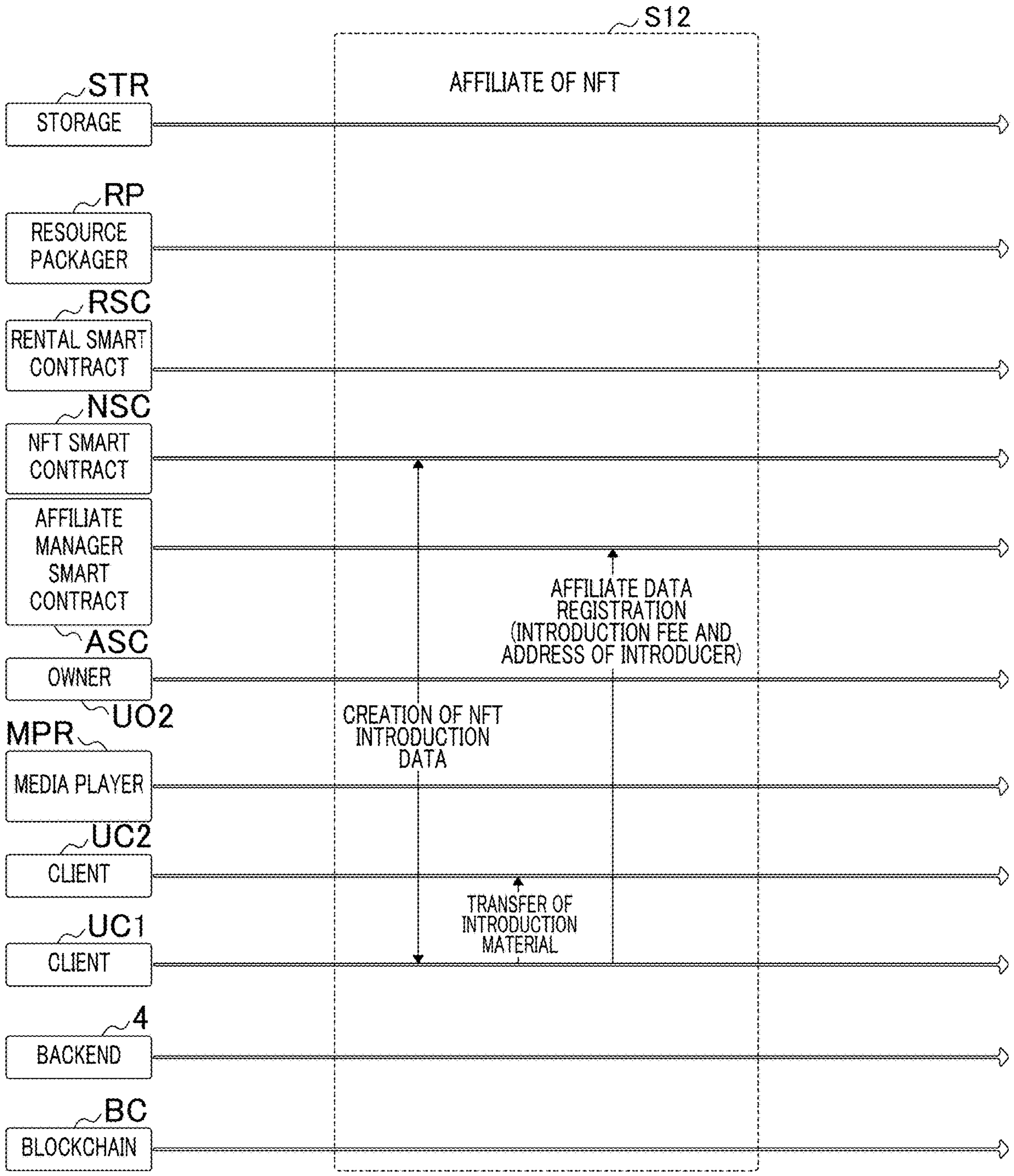
FIG. 9 is an enlarged view of an affiliate of the NFT in step S2 of FIG. 2.
Figure 10:
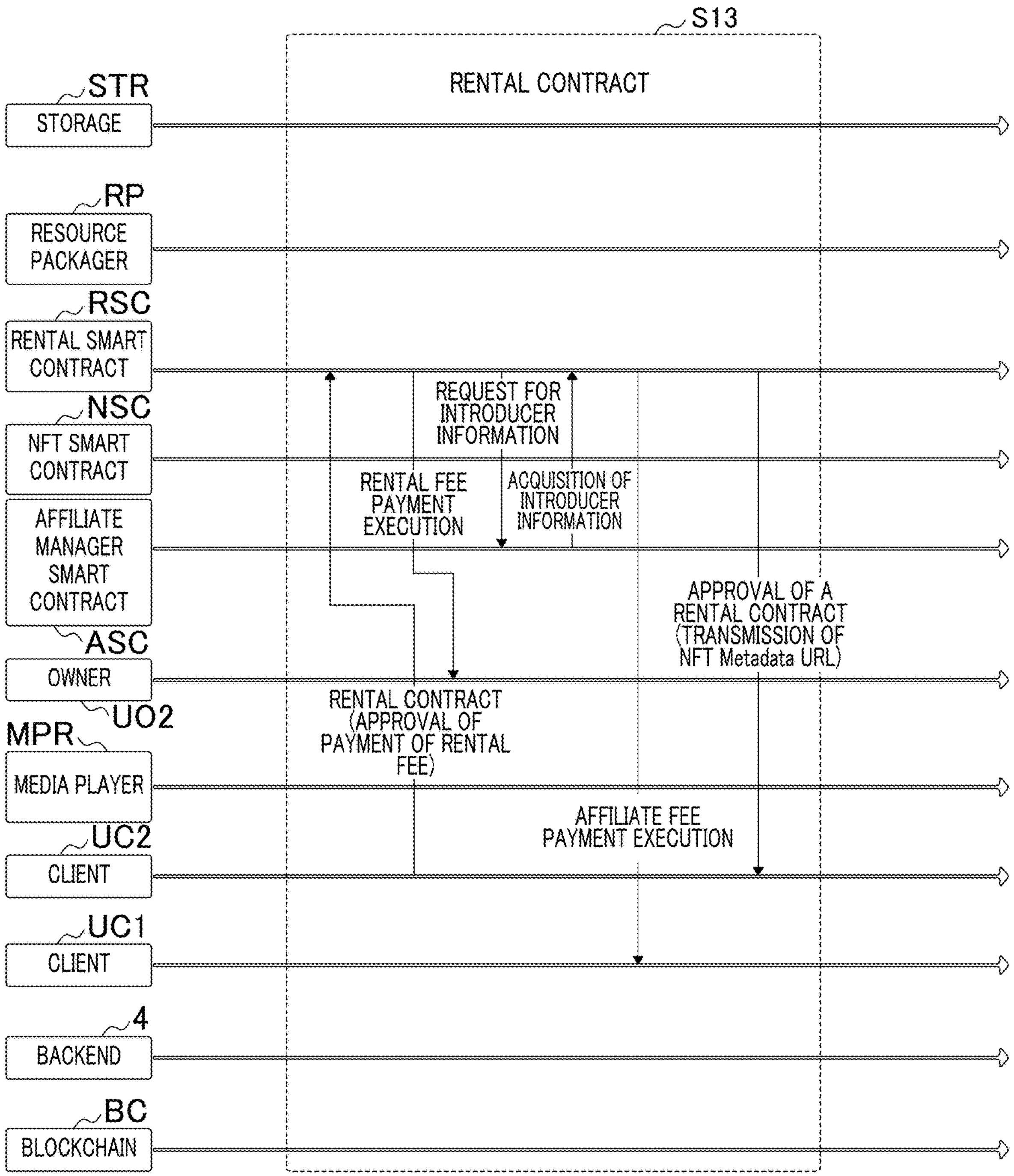
FIG. 10 is an enlarged view of the rental contract in step S3 of FIG. 2.
Figure 11:
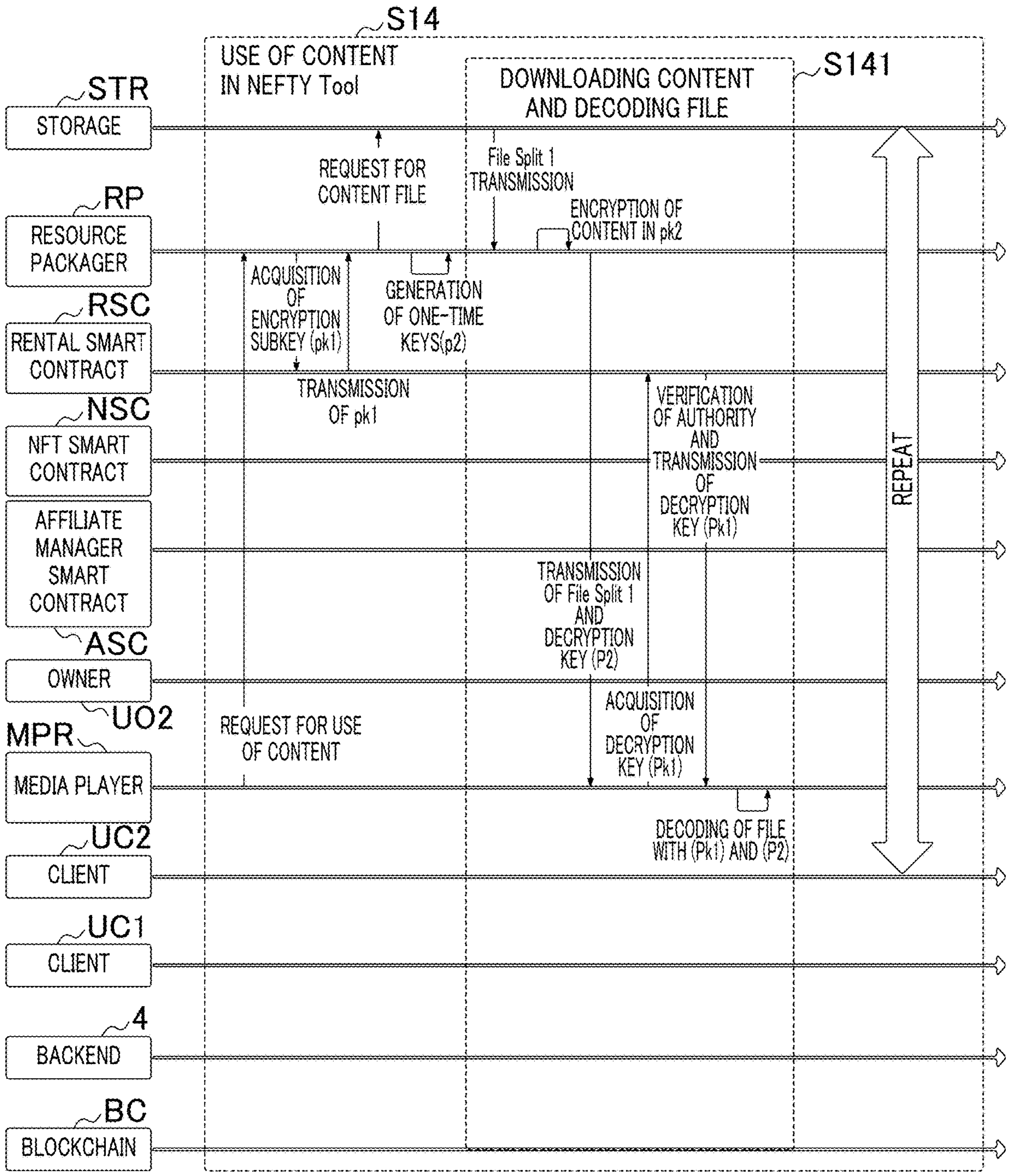
FIG. 11 is an enlarged view of usage of content in NEFTY TOOL in step S4 of FIG. 2.

FIG. 7 is a sequence chart illustrating the flow of the present service for an owner who registers digital content for which the NFT has been issued, a first client who rents the digital content, and a second client who rents the digital content in response to an introduction from the first client among the users in FIG. 1. FIG. 8 is an enlarged view of the NFT registration in step S1 of FIG. 2. FIG. 9 is an enlarged view of an affiliate of the NFT in step S2 of FIG. 2. FIG. 10 is an enlarged view of the rental contract in step S3 of FIG. 2. FIG. 11 is an enlarged view of usage of content in NEFTY TOOL in step S4 of FIG. 2.

First, the flow of the present service will be described by focusing on an owner UO1 who issues the NFT of the digital content among the users in FIG. 1. Thereafter, the flow of the present service for an owner UO2 who registers the digital content for which the NFT has been issued among the users in FIG. 1 will be described only in terms of differences from the flow of the present service for the owner UO1.

As shown in FIG. 1, the owner UO1 can receive the service by operating his/her own terminal 1-O1 (hereinafter, referred to as "user terminal 1-O1") such as a smartphone. Therefore, hereinafter, the expression "the owner UO1 does . . . " indicates that "the user terminal 1-O1 executes the processing of . . . ". A client UC1 can receive the service by operating his/her own terminal 1-C1 (hereinafter referred to as "user terminal 1-C1") such as a smartphone. Therefore, hereinafter, the expression "Client UC1 does . . . " indicates that "User terminal 1-C1 executes the processing of . . . ". The client UC2 can receive the service by operating his/her own terminal 1-C2 (hereinafter, referred to as "user terminal 1-C2") such as a smartphone. Therefore, hereinafter, the expression "Client UC2 does . . . " indicates that "User terminal 1-C2 executes the processing of . . . ".

The owner UO1 registers the NFT in step S1 of FIG. 2 and FIG. 3 via a marketplace MP of FIG. 1 to have the ownership of the NFT associated with a digital content (hereinafter, abbreviated as "content"). Here, the content is encrypted with a specific key (private key P1 described later), and then stored in a storage STR.

The marketplace MP is managed by a marketplace system 2 configured by a server or the like. The storage STR is managed by a storage system 3 configured by a server or the like. Therefore, in practice, step S1 in FIG. 2 and FIG. 3 is executed as processing involving transmission and reception of information among the user terminal 1-O1, the marketplace system 2, and a blockchain BC.

The content encrypted in this manner can be used for display or reproduction only when the specific key and the media player MPR serving as a dedicated tool are used. This makes it possible for the user of the content (the client UC1 or the client UC2) to use the content while the owner UO1 has the ownership of the NFT, that is, while preventing the act of infringing on the right of the owner UO1.

That is, the client UC1 or the client UC2 that has made the rental contract in step S3 in FIG. 2 and FIG. 5 can use the content in the NEFTY TOOL in step S4, in particular, can use the content such as display or reproduction by the media player MPR only after downloading and decoding of the content in step S41. Here, the media player MPR is managed by a viewer system 5 constituted by a server or the like. Therefore, in practice, step S3 and step S4 (including step S41) in FIG. 2 and FIG. 5 are executed as processing involving transmission and reception of information among the user terminal 1-C1 or the user terminal 1-C2, the marketplace system 2, the viewer system 5, and the blockchain BC.

Hereinafter, the flow of the present service will be specifically described. First, registration of the NFT in step S1 of FIG. 2 and FIG. 3 will be described.

The owner UO1 causes a Smart Contract NSC to issue an NFT for the content to be registered in the marketplace MP.

The owner UO1 encrypts the content and stores the encrypted content in the storage STR (uploads the content file). Here, although details will be described later with reference to FIG. 15, the storage STR is configured by a cloud (server type storage) or a decentralized type storage (DSS). With such a configuration, even when unexpected content (data), system damage, or abnormal operation occurs, loss of the content is prevented, and the profits of the owner UO1 (in the example described later, the owner UO2) and the clients UC1 and UC2 are protected. Further, since the owner UO1 (in the example described later, the owner UO2) stores the content in the decentralized storage, the clients UC1 and UC2 can search and use the content 24 hours and 365 days. Specifically, for example, the resource packager RP of the storage system 3 divides the content based on the elliptic curve encryption algorithm, encrypts the content with the private key P1 known only by the owner UO1, and stores the encrypted content in the storage STR. Here, the resource packager RP is a system that transmits and receives contents and encrypts the contents. Further, management of the private key P1 and the like (transmission when an acquisition request is made at the time of using content, and the like) is performed by a rental Smart Contract.

When the owner UO1 permits the rental of the content by the present service, the owner UO1 registers the rental Smart Contract RSC in the blockchain BC (approves the NFT).

Here, it is assumed that the client UC1 has completed the rental contract with the owner UO1. The details of the rental contract will be described later as step S3 in FIG. 2 and FIG. 4 from the viewpoint of the client UC2. In this case, the client UC1 can use (display, reproduce, or the like) the content associated with the NFT of the owner UO1, that is, the content encrypted in the storage STR in the above-described step S1 by using the media player MPR. Such use of the content is specifically performed along the flow of use of the NEFTY Tool in step S4 of FIG. 2 and FIG. 6.

First, the media player MPR operated by the client UC1 requests a resource packager RP to use the content. The resource packager RP requests a rental Smart Contract RSC to acquire a sub key Pk1 (hereinafter, referred to as "decryption key Pk1" as appropriate) corresponding to the private key P1. Upon receiving the request for acquiring, the rental Smart Contract RSC transmits the sub key Pk1 to the resource packager RP. The resource packager RP requests the storage STR to download the content. The resource packager RP generates a one-time key P2 (hereinafter referred to as "decryption key P2" as appropriate) and a sub key Pk2 corresponding to the one-time key P2.

With such a configuration, the download of the content and the decoding of the file in step S41 of FIG. 2 and FIG. 6 are performed as follows. That is, the storage STR transmits the content (File Split1) encrypted with the private key P1 to the resource packager RP. The resource packager RP encrypts the content with the one-time key P2 or the like. That is, the resource packager RP combines the private key Pk1 of the owner UO1 with the one-time key P2 generated by itself, and encrypts the content again. The resource packager RP transmits the content re-encrypted by combining the private key Pk1 and the one-time key P2 (File Split1) and the one-time key Pk2 to the media player MPR operated by the client UC1. The media player MPR operated by the client UC1 requests the rental Smart Contract RSC to transmit the private key Pk1 (decryption key Pk1). Upon receiving the request for transmitting, the rental Smart Contract RSC confirms whether the person who lends the content encrypted by the private key Pk1 is the correct owner UO1, as the confirmation of the authority. When confirming the ownership of the person who lends, the rental Smart Contract RSC transmits the private key Pk1 to the media player MPR operated by the client UC1. With such a configuration, the client UC1 can acquire the sub key Pk1 (and the one-time key P2) of the owner UO1 for decrypting the content (file) only when it is confirmed that the client UC1 has access authority (use authority) to the content. The media player MPR decrypts the content using the sub key Pk1 and the one-time key P2, and executes reproduction or the like. This enables the client UC1 to use the content.

Figure 15:
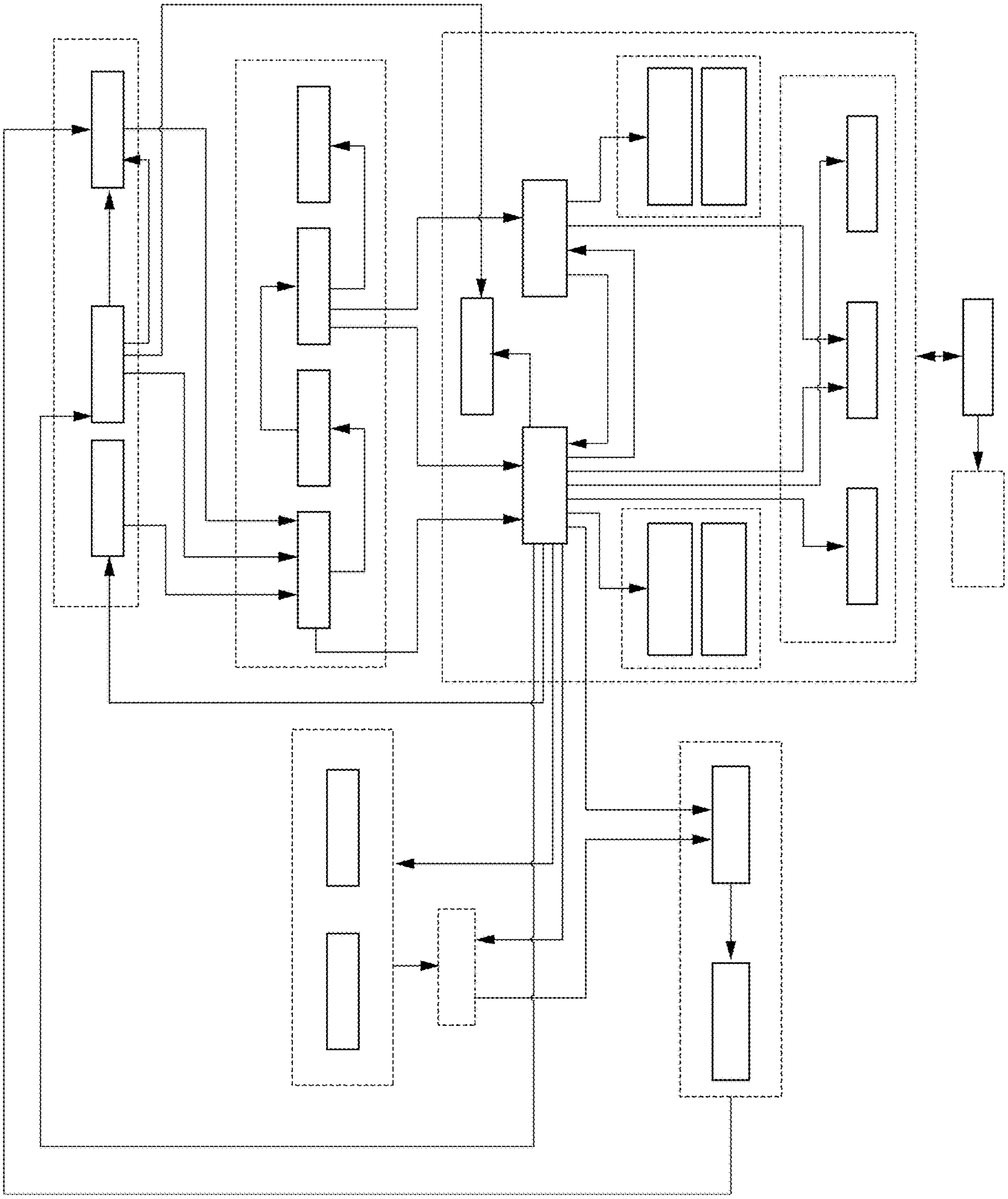
FIG. 15 is a diagram showing more detailed relationships among blocks and the like constituting the information processing system for providing the present service in FIG. 14.

As described above, since the content associated with the NFT issued by the owner UO1 is encrypted, only the owner UO1 can decrypt the file of the content even if the storage STR (the file of the content stored therein) receives a malicious attack. The owner UO1 can set conditions such as a use period of content with the rental Smart Contract RSC, and can sell the usage right by virtual currency or the like. The media player MPR is a dedicated tool for using the content (dedicated application: viewer tool for images, moving images, and music). The media player MPR takes measures against content capture and illegal download. In addition, the owner UO1 can use measures such as a watermark and a blur for asserting the ownership of the content. Further, as shown in FIG. 15 to be described later, the present service applies a bridge technology capable of mutually operating services of various blockchains (blockchain BC and other blockchains) to which NFT is issued, and makes it possible to use and pay for contents between different blockchains.

Next, the affiliate program will be described. In this service, an affiliate program is provided in which contents used by the client UC1 are introduced to a third party (in the examples of FIGS. 1 to FIG. 11, the client UC2) and the client UC1 can obtain an introduction fee when the introduced third party uses the contents. The affiliate program offers the opportunity to gain profits for influencers, KOLs, and the like, which have many followers in SNS and the like.

The client UC1 can use (rent) the content associated with the NFT of the owner UO1 and introduce the content to the client UC2. When the client UC2 uses (rents) the content, the introduction fee is paid from the owner UO1 to the client UC1. In order to realize the affiliate program, an affiliate manager Smart Contract ASC is created in the blockchain BC. The affiliate manager Smart Contract ASC internally stores information for each user.

Hereinafter, the affiliate of the NFT in step S2 of FIG. 2 and FIG. 4 and the rental contract in step S3 of FIG. 2 and FIG. 5 regarding the affiliate program will be described.

The affiliate of the NFT in step S2 of FIG. 2 and FIG. 4 is as follows. That is, the client UC1 causes the NFT Smart Contract NSC to create the NFT introduction data, that is, the URL for introducing the content to another person. The NFT introduction data (URL) includes information of the content and information of the client UC1. The client UC1 transmits the NFT introduction data (URL) to the client UC2. The client UC1 registers the affiliate data (the introduction fee and the address of the client UC2 as the introducer) in the affiliate manager Smart Contract ASC.

The rental contract in step S3 of FIG. 2 and FIG. 5 is as follows. The client UC2 that has received the introduction from the client UC1 makes a rental contract (approval of payment of a rental fee) for the content associated with the NFT of the owner UO1 to the rental Smart Contract RSC. The rental Smart Contract RSC pays the rental fee to the owner UO1. The rental Smart Contract RSC requests the affiliate manager Smart Contract ASC for the introducer information of the client UC2. The rental Smart Contract RSC acquires the introducer information of the client UC2 transmitted from the affiliate manager Smart Contract ASC. Here, the affiliate fee (introduction fee) is set as Royalty Info when the owner UO1 issues the NFT. Therefore, the rental Smart Contract RSC reads the Royalty Info from the NFT and pays the client UC1 for the affiliate fee set therein. In addition, the affiliate transaction to be registered in the affiliate manager Smart Contract ASC needs to be generated from the wallet of the owner UO1. The fee of the affiliate manager Smart Contract ASC is paid by the owner UO1 of the NFT. The rental Smart Contract RSC approves the client UC2 of the rental contract (transmission of the NFT metadata URL).

As described above, when the rental contract in step S3 of FIG. 2 and FIG. 5 for the client UC2 ends, the client UC2 can use the rented content in accordance with the flow of using the NEFTY Tool in step S4 of FIG. 2 and FIG. 6.

The flow of the present service has been described above by focusing on the owner UO1 who issues the NFT of the digital content among the users in FIG. 1. The flow of the present service for the owner UO2 who registers the digital content for which the NFT has been issued among the users in FIG. 1 is the same as the flow of the present service for the owner UO1 described above, except that the registration of the NFT in step S11 in FIG. 7 and FIG. 8 is executed instead of the registration of the NFT in step S1 in FIG. 2 and FIG. 3. Hereinafter, only the registration of the NFT in step S11 of FIG. 7 and FIG. 8 will be described as the flow of the present service for the owner UO2 who registers the digital content for which the NFT has been issued among the users of FIG. 1.

A backend 4 acquires the NFT information of the owner UO2 from the blockchain BC. The owner UO2 encrypts the content registered in the marketplace MP and stores the encrypted content in the storage STR (uploads the content file). Specifically, for example, the resource packager RP of the storage system 3 divides the content based on an elliptic curve encryption algorithm, encrypts the divided content with a private key P1 (which is different from that of the owner UO1) known only to the owner UO2, and stores the encrypted content in the storage STR. When the owner UO2 permits the rental of the content by the present service, the owner UO2 registers the rental Smart Contract RSC in the blockchain BC (approves the NFT).

Figure 12:
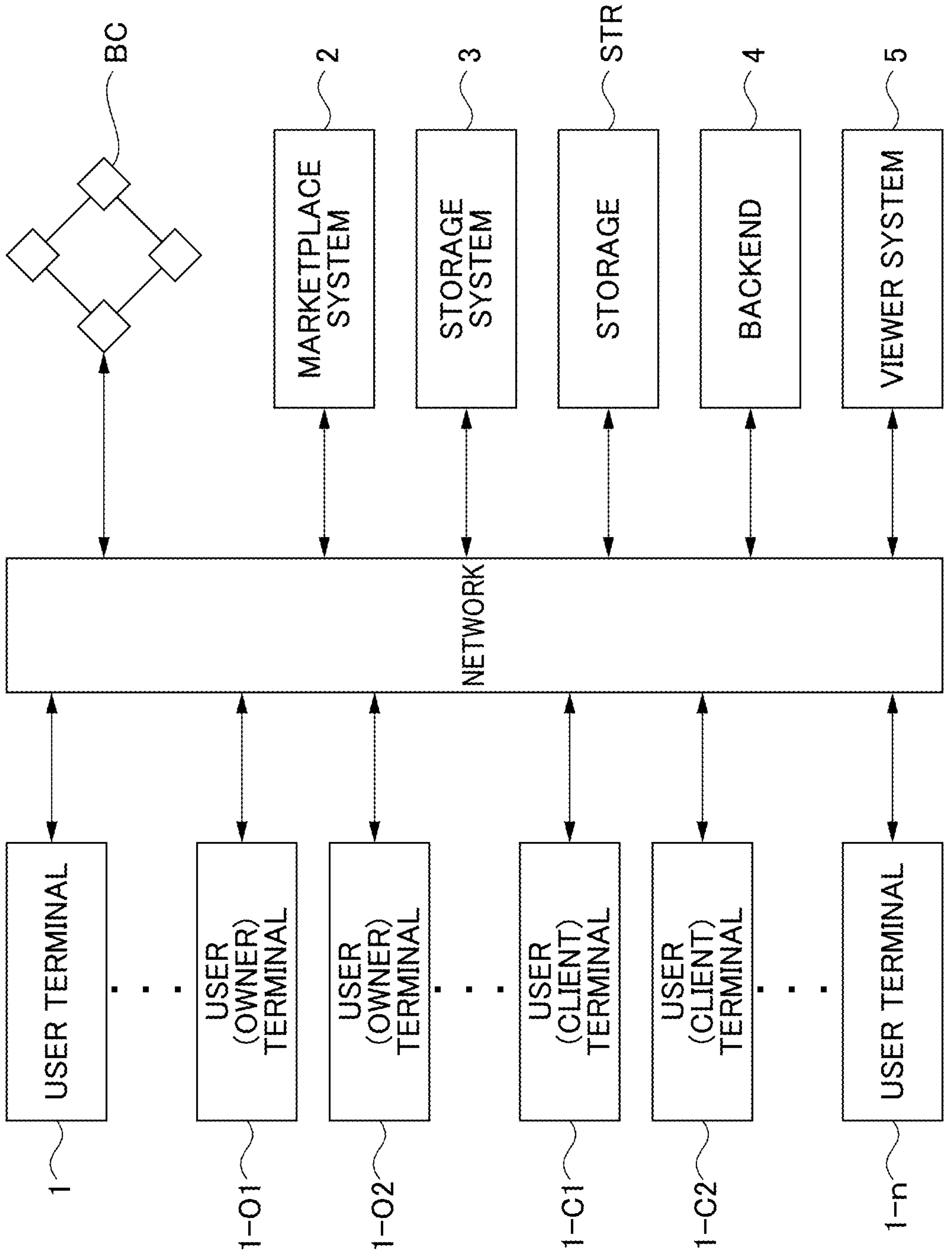
FIG. 12 is a diagram showing a configuration example of an information processing system applied to the present service of FIG. 1, that is, an embodiment of the information processing system of the present invention.

Next, the configuration of the information processing system applied to the present service of FIGS. 1 to FIG. 11 will be described. FIG. 12 is a diagram showing a configuration example of an information processing system applied to the present service of FIG. 1, that is, an embodiment of the information processing system of the present invention. For example, as shown in FIG. 12, the information processing system of the present embodiment is configured by connecting user terminals 1-1 to **1-*n* of n number of people (n is an integer of 1 or more), the marketplace system 2, the storage system 3, the storage STR, the backend 4, the viewer system 5**, and the blockchain BC to a network N such as the Internet.

The user terminals 1-1 to **1-*n* are information processing terminals such as smartphones operated by n number of users (n is an integer of 1 or more) (which may be owners or clients). The user terminals 1-1 to 1-*n* also include the user terminal 1-01 of the owner UO1, the user terminal 1-O2 of the owner UO2, the user terminal 1-C1 of the client UC1, and the user terminal 1-C2 of the client UC2. Hereinafter, when it is not necessary to distinguish the n number of users individually, the user terminals 1-1 to 1-*n* are collectively referred to as "user terminal 1". The marketplace system 2 is configured by a server or the like managed by the marketplace MP (FIG. 1). The storage system 3 is configured by a server or the like that performs management and processing on the storage STR and includes the resource packager RP (FIG. 2 and the like). The backend 4 has functions of acquiring data relating to a transaction from the blockchain BC as past data in real time and storing the data in a database, and acquiring the material from the database when a request is made by a user (in this example, the owner UO1, the owner UO2, the client UC1, and the client UC2). In the drawings, the backend 4 is shown as hardware (device or system), but may exist as (a part of) a software program in the user terminal 1. The viewer system 5 has a function of executing control of the media player MPR (FIG. 1, etc.). In the drawings, the viewer system 5 is shown as hardware (device or system), but may exist as a software program in the user terminal 1**.

Figure 13:
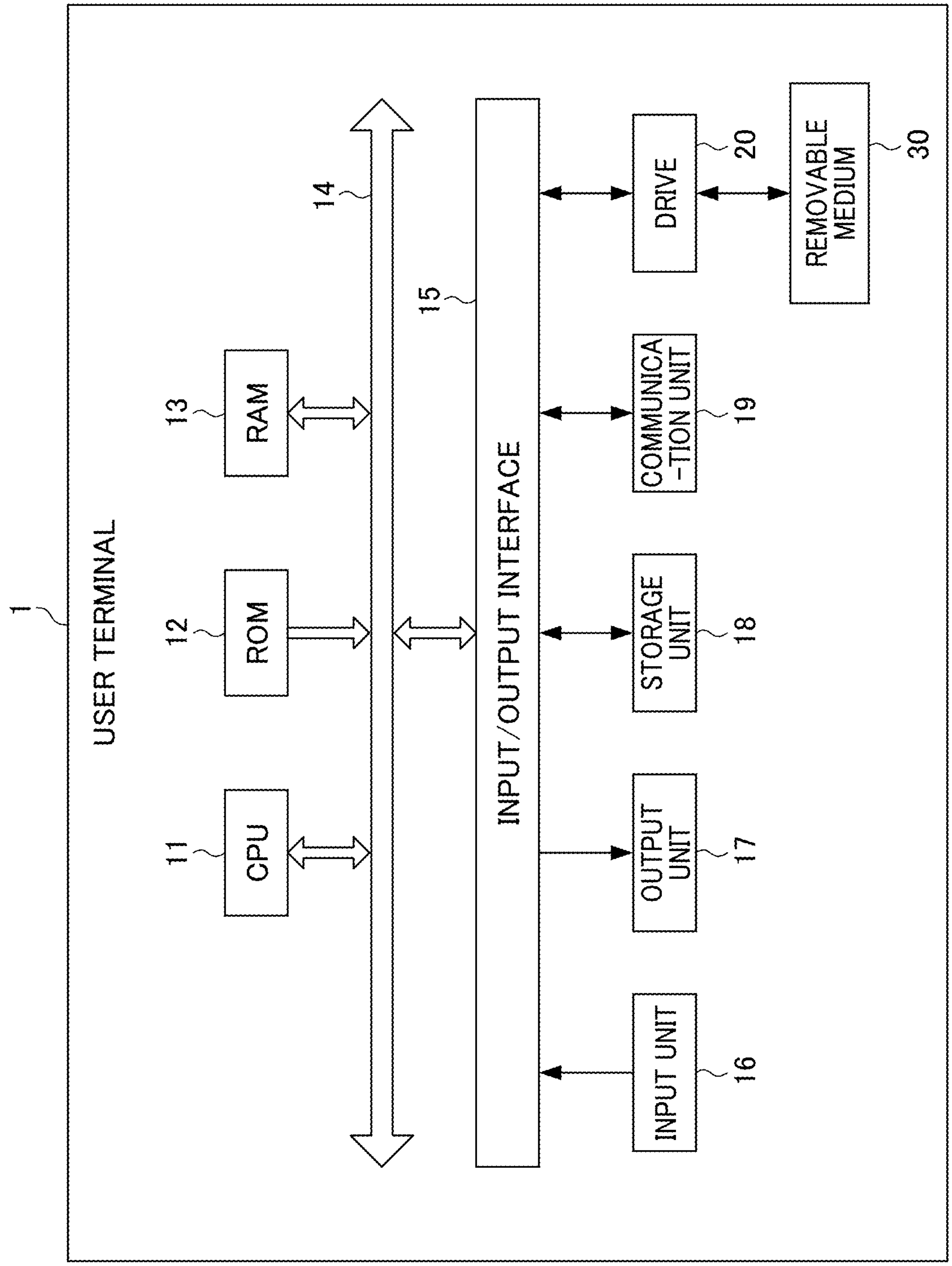
FIG. 13 is a block diagram showing an example of the hardware configuration of a user terminal in the information processing system shown in FIG. 12.

FIG. 13 is a block diagram showing an example of a hardware configuration of a user terminal in the information processing system shown in FIG. 12.

The user terminal 1 includes a CPU (Central Processing Unit) 11, ROM (Read Only Memory) 12, RAM (Random Access Memory) 13, a bus 14, an input/output interface 15, an input unit 16, an output unit 17, a storage unit 18, a communication unit 19, and a drive 20.

The CPU 11 executes various pieces of processing in accordance with a program recorded in the ROM 12 or a program loaded from the storage unit 18 to the RAM 13. The RAM 13 also appropriately stores data and the like necessary for the CPU 11 to execute various pieces of processing.

The CPU 11, the ROM 12, and the RAM 13 are connected to each other via the bus 14. The input/output interface 15 is also connected to the bus 14. The input unit 16, the output unit 17, the storage unit 18, the communication unit 19, and the drive 20 are connected to the input/output interface 15.

The input unit 16 includes, for example, a keyboard, and outputs various kinds of information. The output unit 17 includes a display such as a liquid crystal display, a speaker, and the like, and outputs various kinds of information as images and sounds. The storage unit 18 is configured by DRAM (Dynamic Random Access Memory) or the like, and stores various kinds of data. The communication unit 19 communicates with another device (for example, the marketplace system 2 to the viewer system 5 and the blockchain BC shown in FIG. 12.) via the network N including the Internet.

A removable medium 30 such as a magnetic disk, an optical disk, a magneto-optical disk, or a semiconductor memory is appropriately mounted on the drive 20. The program read from the removable medium 30 by the drive 20 is installed in the storage unit 18 as necessary. The removable medium 30 can also store various data stored in the storage unit 18 in the same manner as the storage unit 18.

In addition, although not shown, the servers and the like constituting the marketplace system 2 to the viewer system 5 in FIG. 12 also have basically the same configuration as the hardware configuration shown in FIG. 11. Therefore, descriptions of the hardware configurations of the marketplace system 2 to the viewer system 5 will be omitted.

Figure 14:
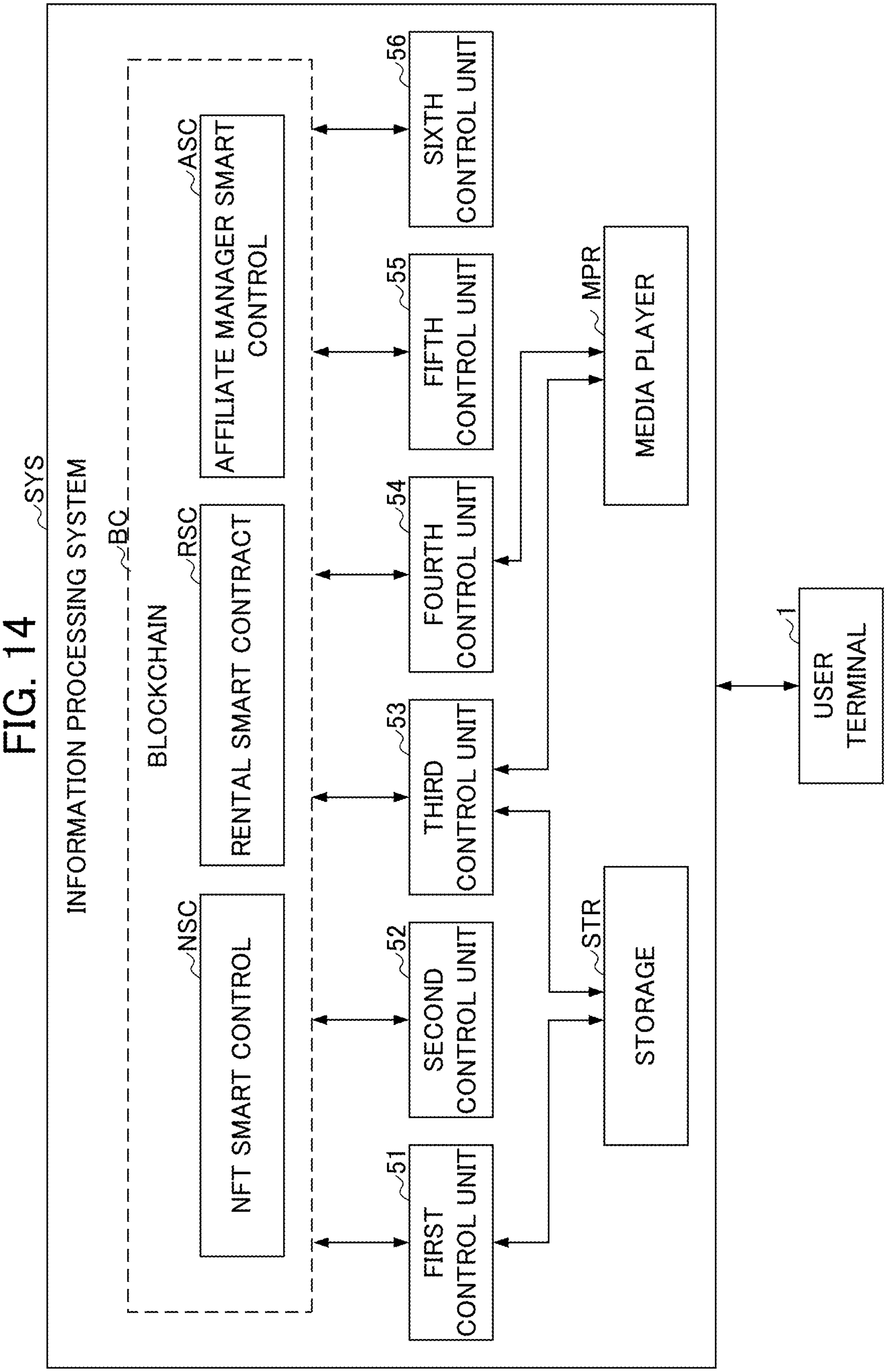
FIG. 14 is a functional block diagram showing an example of the functional configuration of an information processing system having the configuration shown in FIG. 12.

By the cooperation of various pieces of hardware and various pieces of software of the user terminal 1 to the viewer system 5, a series of processing for realizing the present service shown in FIGS. 1 to FIG. 11 can be executed. Hereinafter, an example of a functional configuration of an information processing system SYS including the user terminal 1 for executing the series of processing described above, and the marketplace system 2 to the viewer system 5 will be described with reference to FIG. 14. FIG. 14 is a functional block diagram showing an example of a functional configuration of the information processing system having the configuration shown in FIG. 12.

As shown in FIG. 14, in the information processing system SYS, the blockchain BC, a first control unit 51, a second control unit 52, a third control unit 53, a fourth control unit 54, a fifth control unit 55, and a sixth control unit 56 function. The storage STR is provided in one area of a storage unit of the information processing system SYS (for example, a predetermined decentralized type storage available in the blockchain BC). The information processing system SYS includes the media player MPR.

Here, the blockchain BC incorporates the NFT Smart Contract NSC, the rental Smart Contract RSC, and the affiliate manager Smart Contract ASC. That is, as described above, the Smart Contract is similar to a program that is incorporated in the blockchain and executed according to a preset rule. A portion or all of the control of each of the first control unit 51 to the sixth control unit 56 described below may be executed as a portion or entirety of each Smart Contract. Therefore, for simplicity, in FIG. 14, the first control unit 51 to the sixth control unit 56 and each Smart Contract incorporated in the blockchain BC are illustrated as separate blocks.

The information processing system SYS is configured to control to allow the client UC1 to use the content associated with the NFT with the media player MPR, while the owner UO1 owns the NFT on the blockchain BC. Specifically, the first control unit 51 encrypts the content using the private key P1, stores the encrypted content in the storage STR, and stores the private key P1 by the NFT Smart Contract NSC on the blockchain BC. As a result, the content owned by the owner associated with the NFT is encrypted using the private key P1 and recorded in the storage STR.

The second control unit 52 executes control, according to the NFT Smart Contract NSC, to set the usage right of the content to the client UC1 satisfying a predetermined condition, which is the approval of the payment of the rental fee. The usage right of the content is set to the client UC1 satisfying the predetermined condition.

When the client UC1 requests the use of the content, the third control unit 53 extracts the encrypted content from the storage STR and transmits the content to the media player MPR operated by the client UC1. When it is confirmed that the client UC1 has the usage right, the encrypted content is provided to the client UC1.

With the NFT Smart Contract NSC, the fourth control unit 54 transmits the sub key Pk1 corresponding to the private key P1 to the media player MPR operated by the client UC1 when it is confirmed that the client UC1 has the usage right. When it is confirmed that the client UC1 has the usage right, the sub key Pk1 corresponding to the private key P1 is provided. As a result, the client UC1 can browse the content whose encryption has been released. At this time, as described above, the owner UO1 keeps possessing the ownership of the content. As described above, the client UC1 satisfying the predetermined condition can use the content without transferring the ownership of the content.

Further, as the control, when the client UC1 requests the use of the content, the third control unit 53 can acquire the first key from the NFT Smart Contract NSC, re-encrypt the content extracted from the storage STR using the private key P1 and the sub key Pk2 corresponding to the one-time key P2, and transmit the re-encrypted content and the one-time key P2 to the media player MPR operated by the client UC1.

The affiliate manager Smart Contract ASC can be managed on the blockchain BC having information of the client UC1 in order to realize an affiliate program in which the content used by the client UC1 is introduced to the client UC2 and the client UC1 obtains the introduction fee when the client UC2 uses the content.

Then, the fifth control unit 55 creates introduction data for introducing the content to the client UC2, transmits the introduction data to the client UC2, and registers the information of the client UC1 in the affiliate manager Smart Contract ASC.

The sixth control unit 56 pays, according to the NFT Smart Contract NSC, the introduction fee to the client UC1 when the second control unit executes the control of the setting of the usage right of the content with respect to the client UC2 and the information of the client UC1 is acquired from the affiliate manager Smart Contract ASC to the NFT Smart Contract NSC. With such a configuration, the owner can receive the rental fee from the client UC2 by introduction of the client UC1. Then, the client UC1 can receive the introduction fee. As a result, the client UC1 (or the client UC1 in the future) actively performs the introduction due to the incentive of the introduction. As a result, the client UC2 encounters a new introduction, and the opportunity to encounter new content according to his or her preference increases.

An example of the functional configuration of the information processing system SYS including the user terminal 1 for executing the series of processing described above and the marketplace system 2 to the viewer system 5 has been described above with reference to FIG. 14. Hereinafter, a flow of the above-described series of processing and the like will be described in more detail with reference to FIGS. 15 to FIG. 29.

Figure 16:
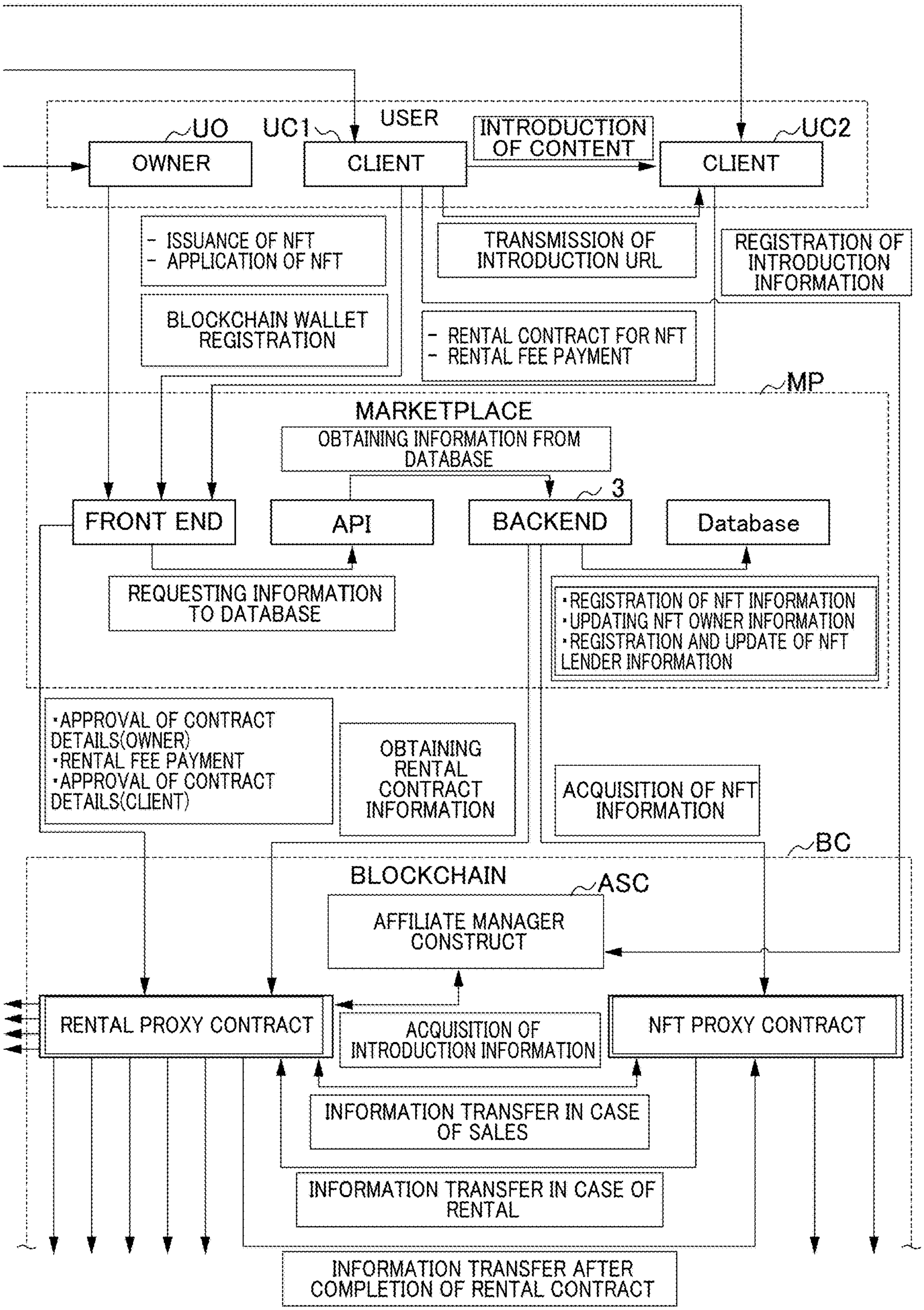
FIG. 16 is an enlarged view of the relationship between the user and the marketplace in the relationships of FIG. 15.
Figure 17:
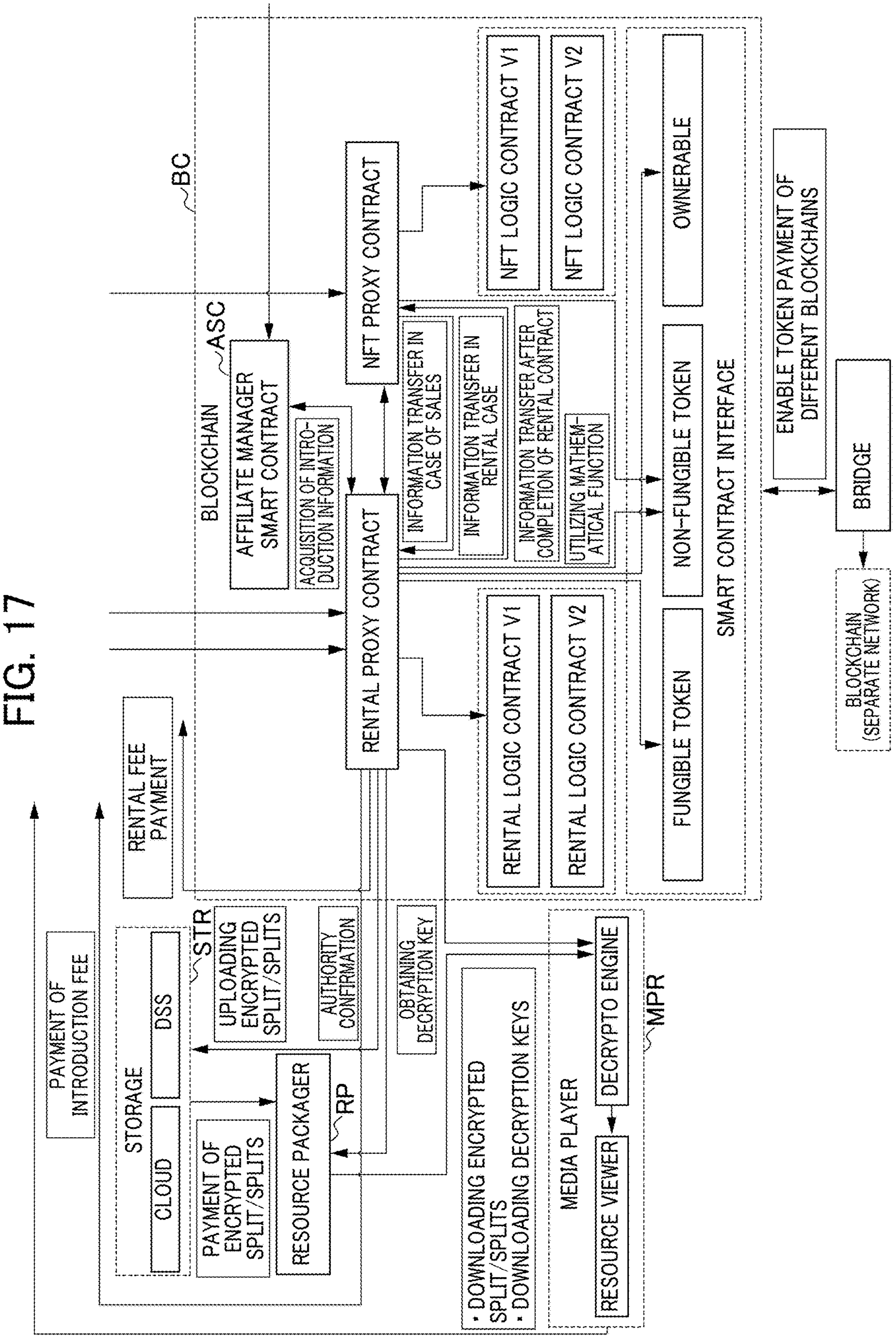
FIG. 17 is an enlarged view of the relationship between the processing on the blockchain at the time of the rental contract and the use of the content using the media player in the relationship of FIG. 15.

FIG. 15 is a diagram showing more detailed relationships among the blocks and the like constituting the information processing system for providing the present service in FIG. 14. FIG. 16 is an enlarged view of the relationship between the user and the marketplace in the relationships of FIG. 15. FIG. 17 is an enlarged view of the relationship between the processing on the blockchain at the time of the rental contract and the use of the content using the media player in the relationship of FIG. 15. As shown in FIGS. 15 to FIG. 17, the client UC1 registers introduction information, and the client UC2 rents via the introduction URL from the client UC1, such that these pieces of information are recorded and managed in the blockchain BC in association with each other. Then, when the client UC2 rents, the introduction fee is paid to the client UC1, and the content is decrypted and becomes available in the media player MPR of the client UC2.

Figure 18:
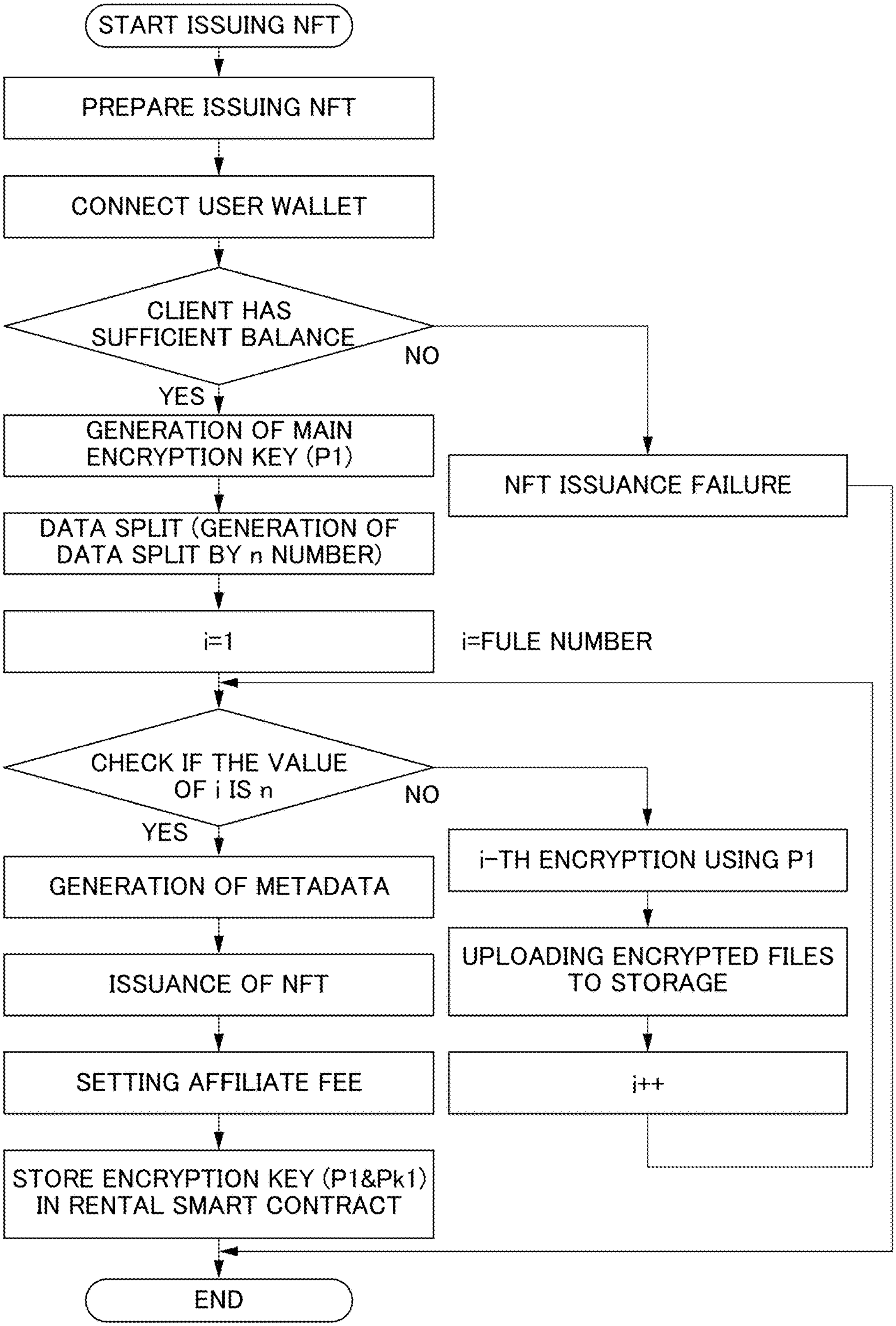
FIG. 18 is a flowchart showing the flow of issuance of the NFT shown in FIG. 1.
Figure 19:
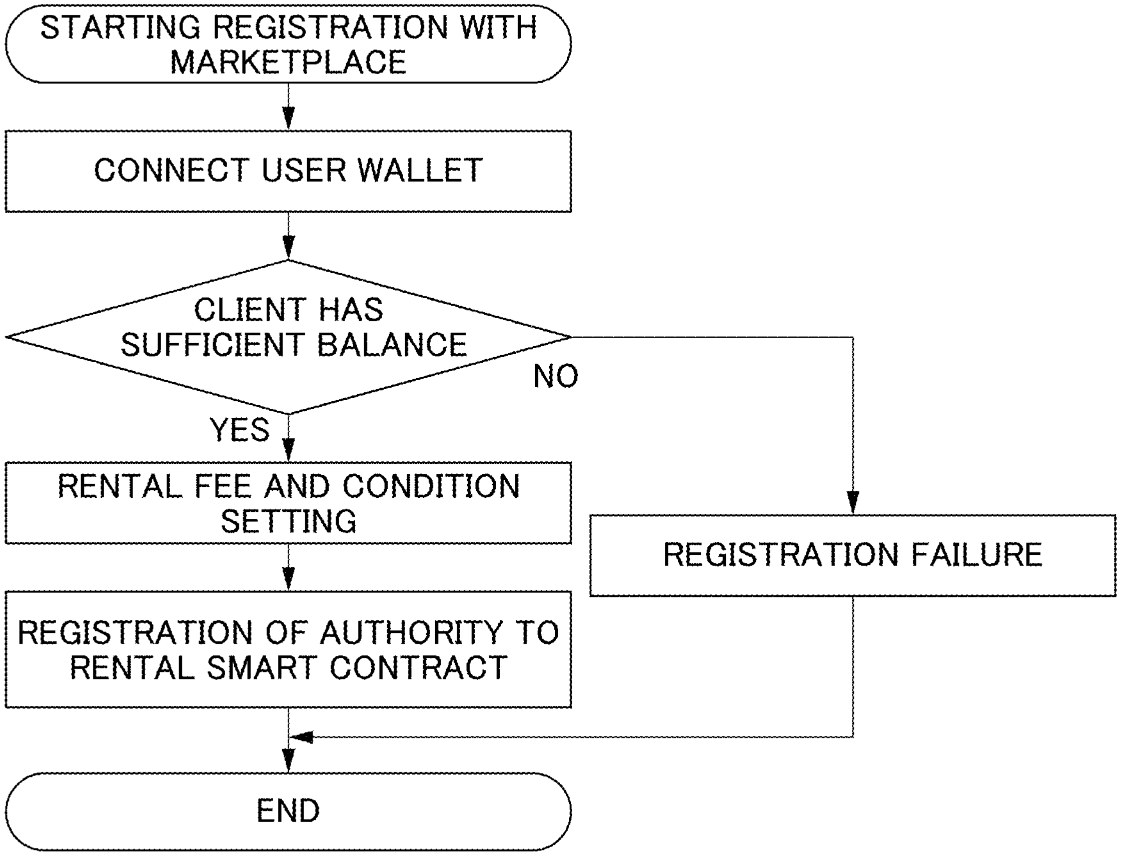
FIG. 19 is a flowchart showing the flow of registration to a marketplace in issuance of the NFT shown in FIG. 18.

FIG. 18 is a flowchart showing the flow of issuance of the NFT shown in FIG. 1. FIG. 19 is a flowchart showing the flow of registration to a marketplace in issuance of the NFT shown in FIG. 18.

In FIG. 18 and FIG. 19, when the private key P1 (main encryption key P1) is generated, a split of data (data divided into n pieces) is generated, encryption is performed on an i-th split (i is an integer value of 1 or more and n or less) using the private key P1, and the encrypted file is uploaded to the storage STR. By repeating this, each of the splits of data is encrypted and recorded. Metadata for these splits is generated and an NFT is issued. At this time, the private key P1 and the sub key Pk1 corresponding to the private key P1 are recorded in the rental Smart Contract RSC. When the client UC1 has a sufficient balance, the rental fee and the condition are set, and the authority is registered in the rental Smart Contract RSC.

Figure 20:
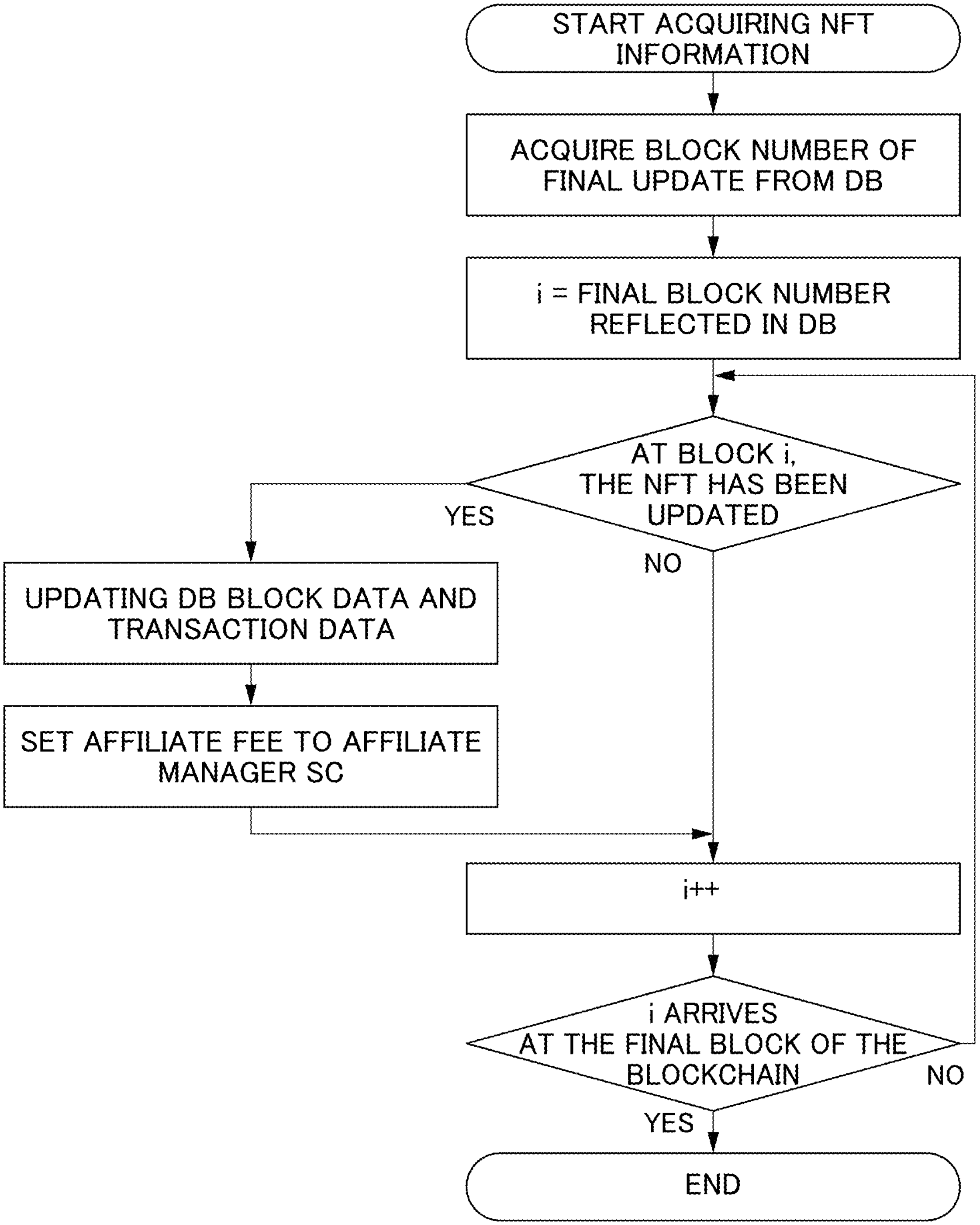
FIG. 20 is a flowchart showing the flow when an NFT exists in advance in issuance of the NFT shown in FIG. 1.
Figure 21:
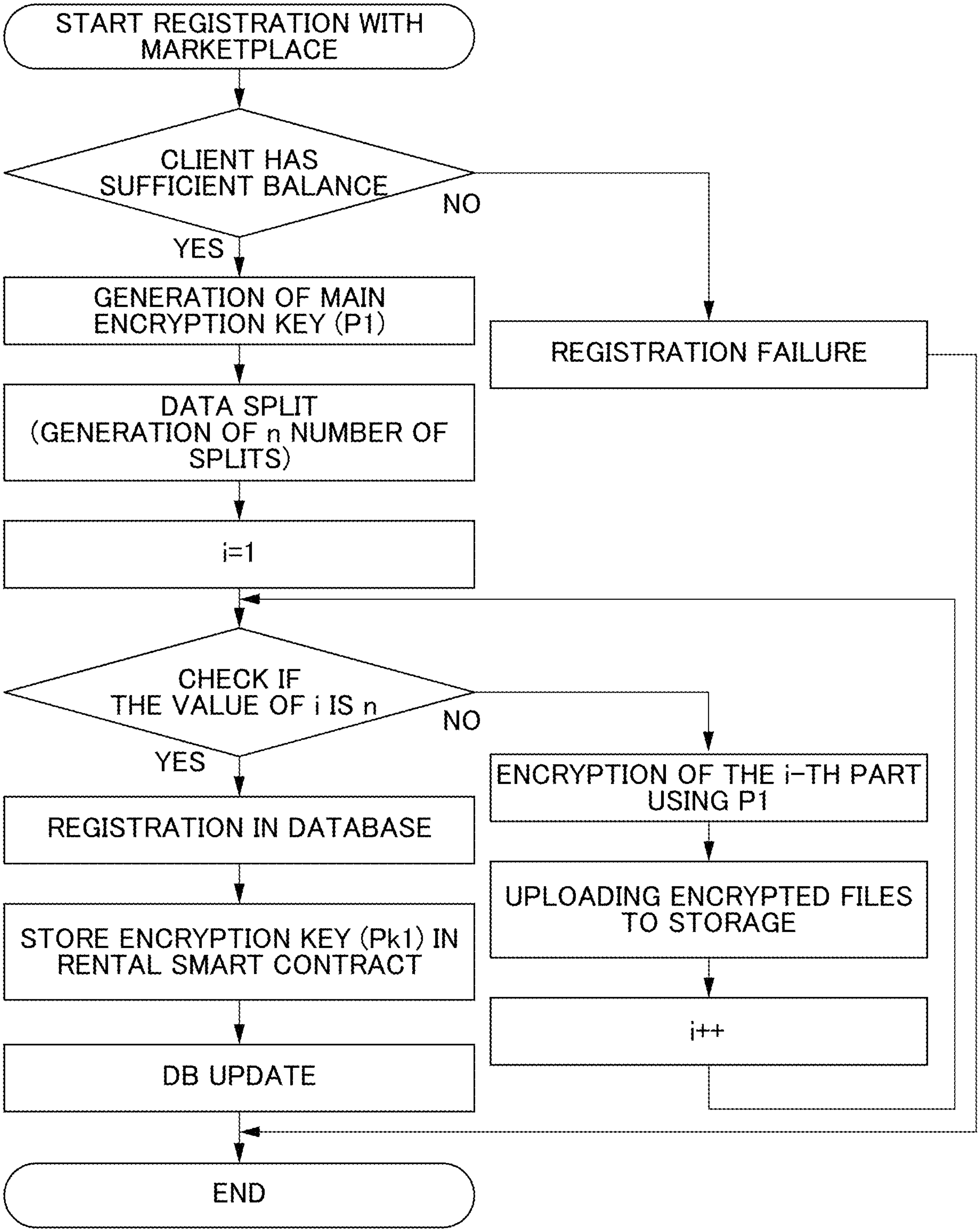
FIG. 21 is a flowchart showing the flow of registration to a marketplace in issuance of the NFT shown in FIG. 20.

FIG. 20 is a flowchart showing the flow when an NFT exists in advance in issuance of the NFT shown in FIG. 1. FIG. 21 is a flowchart showing the flow of registration to a marketplace in issuance of the NFT shown in FIG. 20. In FIG. 20 and FIG. 21, the block number of the last update is obtained from the database, a loop is performed from the block number, the block data and the transaction data of the database are updated, and the affiliate manager Smart Contract ASC and the affiliate fee are set. When the client UC1 has a sufficient balance, the main encryption key P1 is generated, and the split of data is encrypted and stored in the storage STR basically in the same manner as in FIG. 19.

Figure 22:
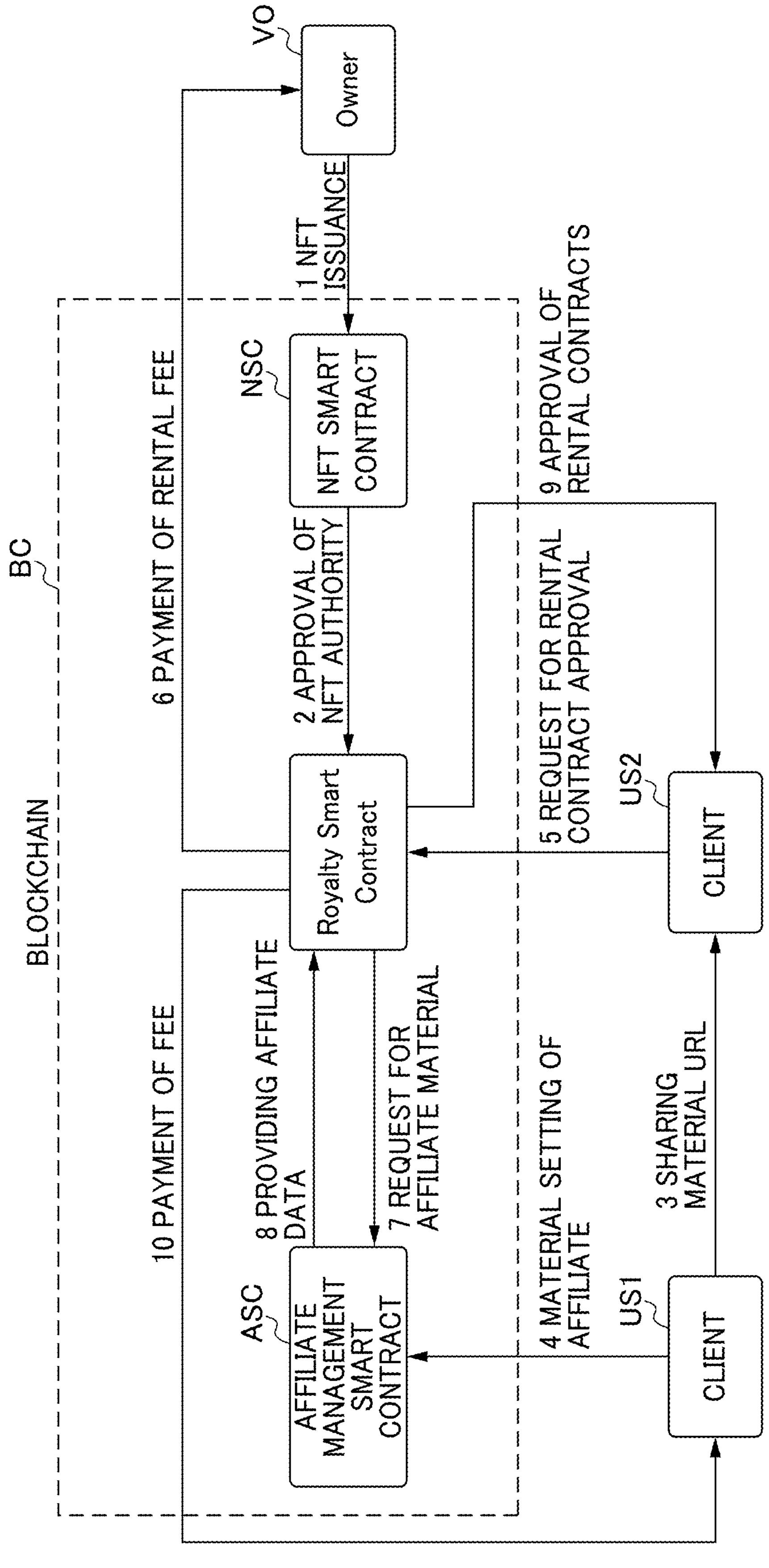
FIG. 22 is a diagram showing the relationship of each Smart Contract shown in FIG. 1.

FIG. 22 is a diagram showing the relationship of each Smart Contract shown in FIG. 1. As illustrated in FIG. 22, the owner UO1 issues an NFT in the NFT Smart Contract NSC. The NFT Smart Contract then authorizes the NFT authority at the royalty Smart Contract. Next, the client UC1 shares the material (introduction) URL with the client UC2. Then, the client UC1 performs affiliate material setting in the affiliate manager Smart Contract ASC. The client UC2 requests rental contract approval in the royalty Smart Contract. The royalty Smart Contract then pays the owner a rental fee. The royalty Smart Contract then requests affiliate material at the affiliate manager Smart Contract ASC. The affiliate manager Smart Contract ASC provides affiliate data to the royalty Smart Contract. As a result, the royalty Smart Contract approves the client UC2 of the rental contract. The royalty Smart Contract then pays the fee to the client UC1. The Smart Contract on the blockchain BC executes processing in this manner.

Figure 23:
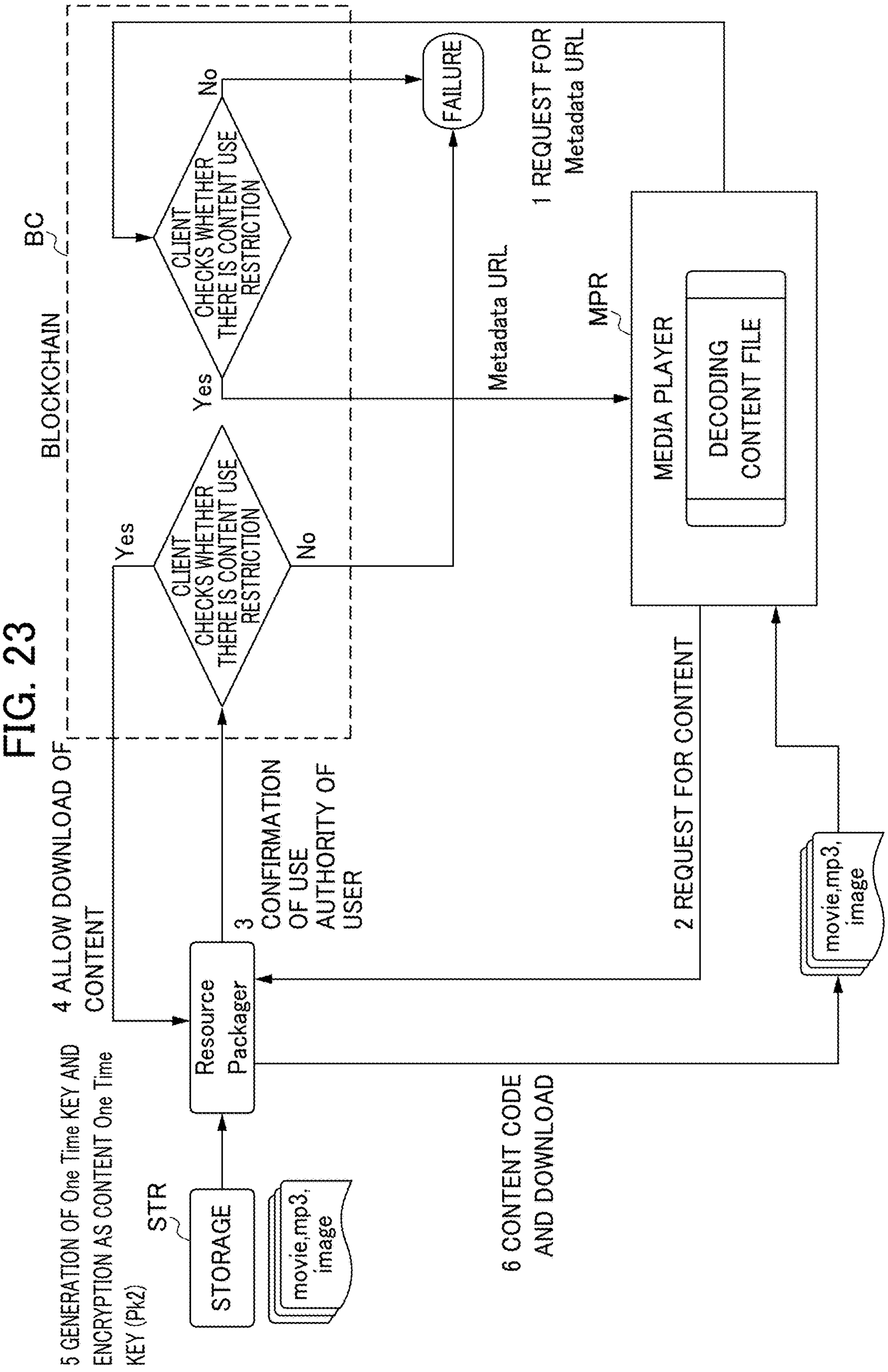
FIG. 23 is a diagram showing the relationship between components when the content shown in FIG. 1 are used.
Figure 24:
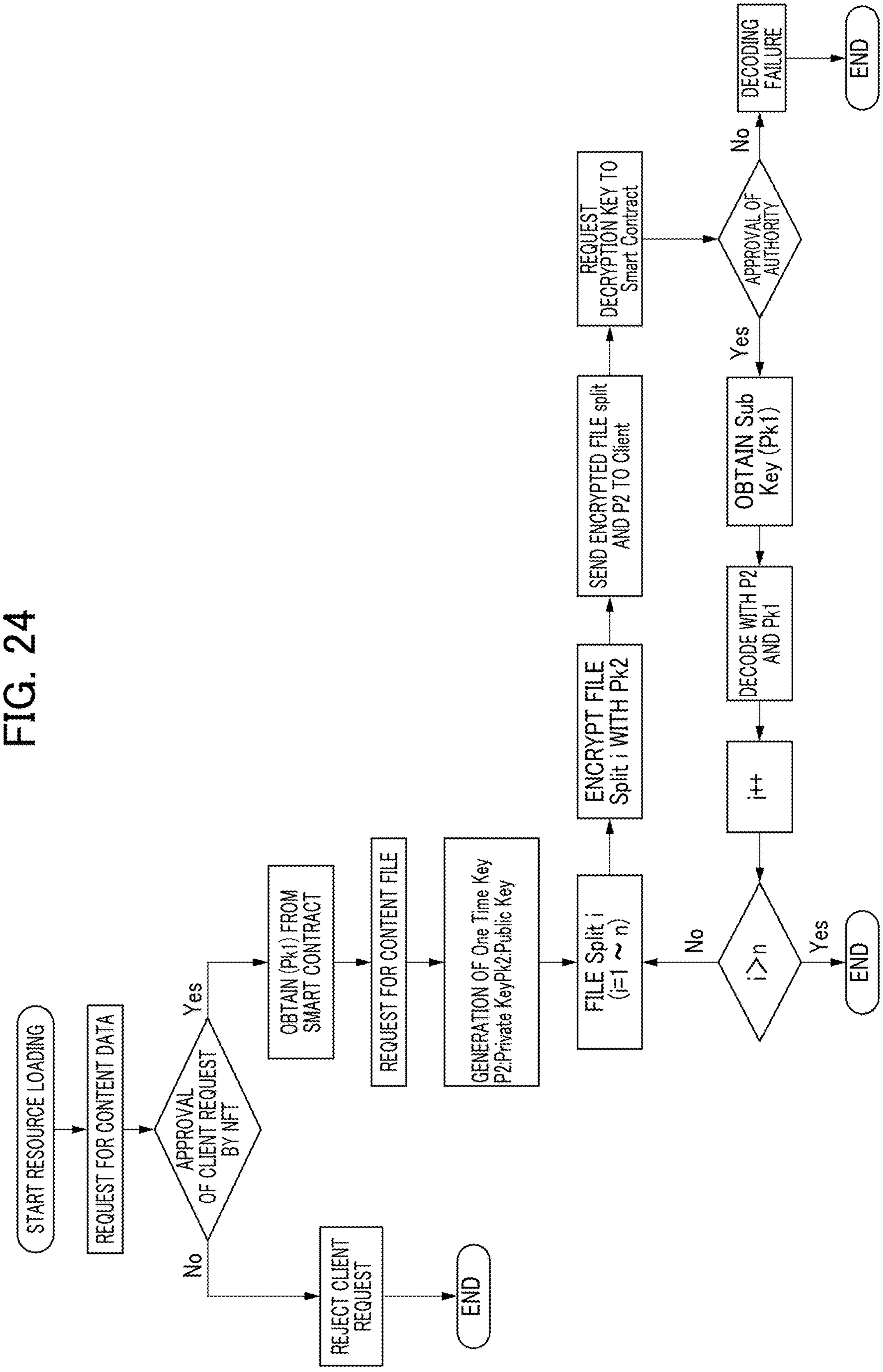
FIG. 24 is a diagram showing the flow of resource reading in a resource packager shown in FIG. 23.

FIG. 23 is a diagram showing the relationship between components when the content shown in FIG. 1 is used. FIG. 24 is a diagram showing the flow of resource reading in a resource packager shown in FIG. 23. As shown in FIG. 23, it is confirmed whether the client UC1 is authorized to use the content, and when the client UC1 is authorized to use the content, the media player MPR decrypts the content file. At this time, the content recorded in the storage STR assists transmission and reception of the content in the resource packager RP. As shown in FIG. 24, the content data is decrypted using a key for decrypting the content recorded in the storage STR, and then re-encrypted using a one-time key.

Figure 25:
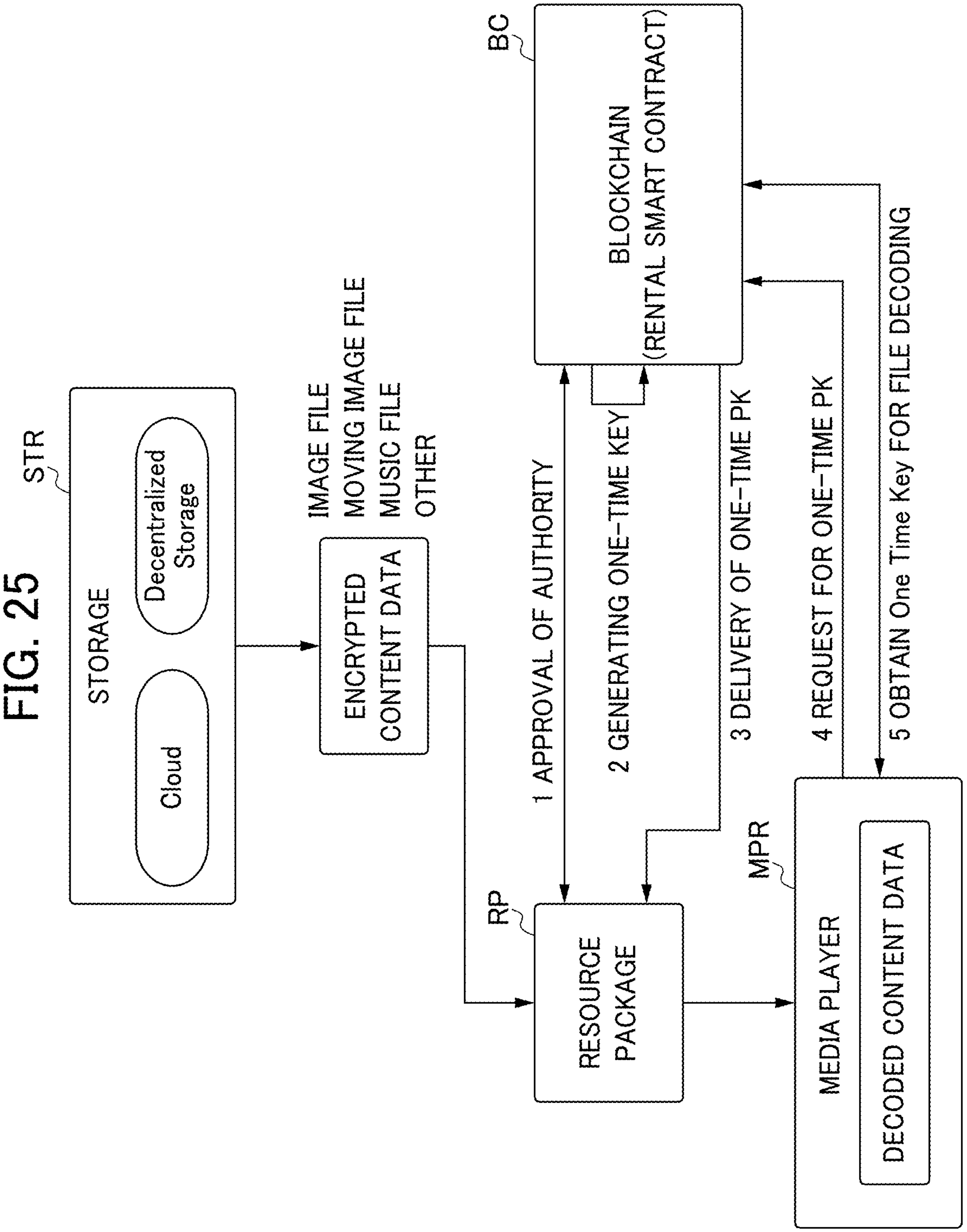
FIG. 25 is a diagram showing the relationship between the components when downloading a single content that is not split in the use of the contents shown in FIG. 1.
Figure 26:
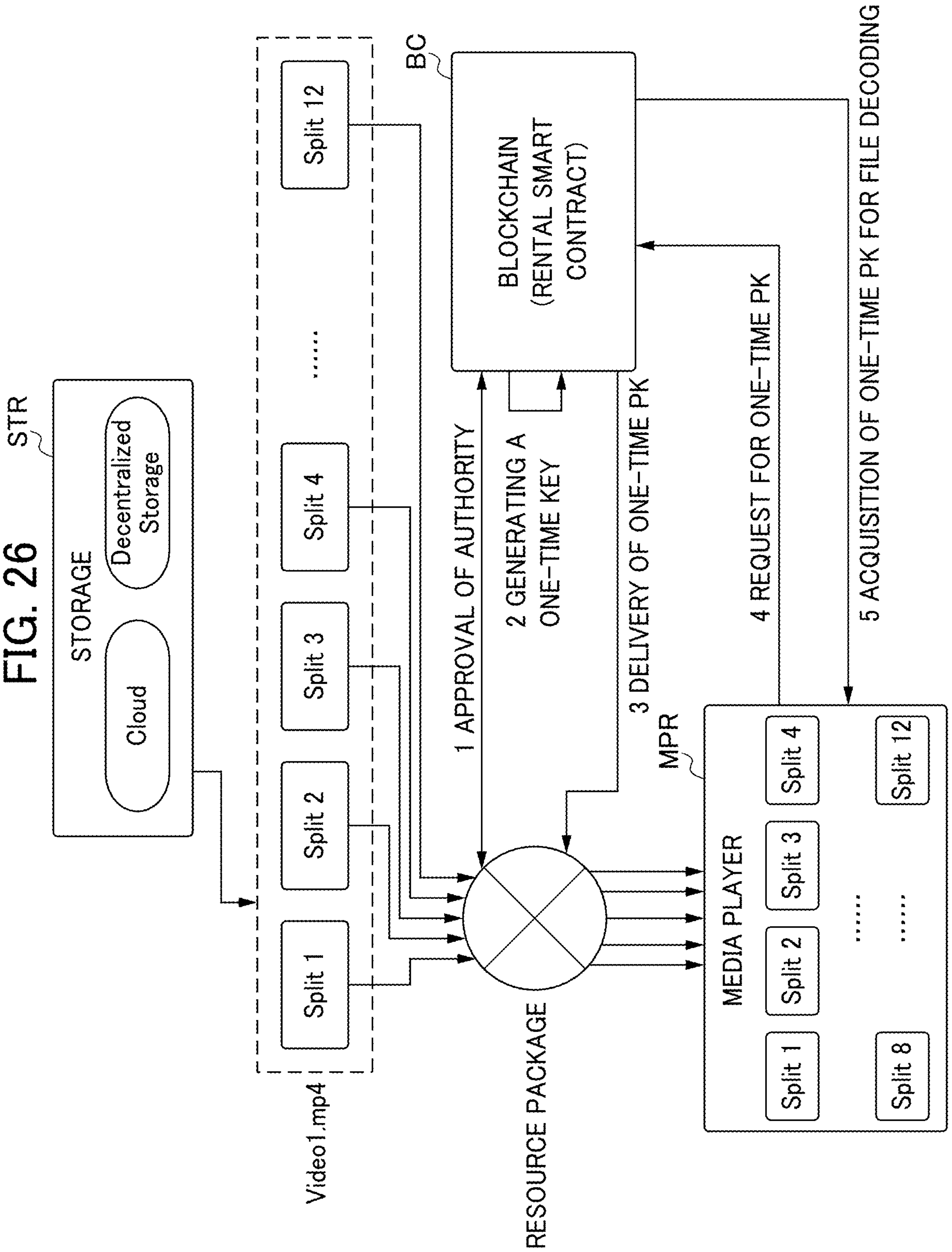
FIG. 26 is a diagram showing the relationship between the components when downloading split contents in the use of the contents shown in FIG. 1.

FIG. 25 is a diagram showing the relationship between the components when downloading a single content that is not split in the use of the contents shown in FIG. 1. FIG. 26 is a diagram showing the relationship between the components when downloading split contents in the use of the contents shown in FIG. 1. As shown in FIG. 25 and FIG. 26, the encrypted content data is downloaded from the storage STR, decrypted and re-encrypted via the resource packager RP, and provided to the media player MPR.

Figure 27:
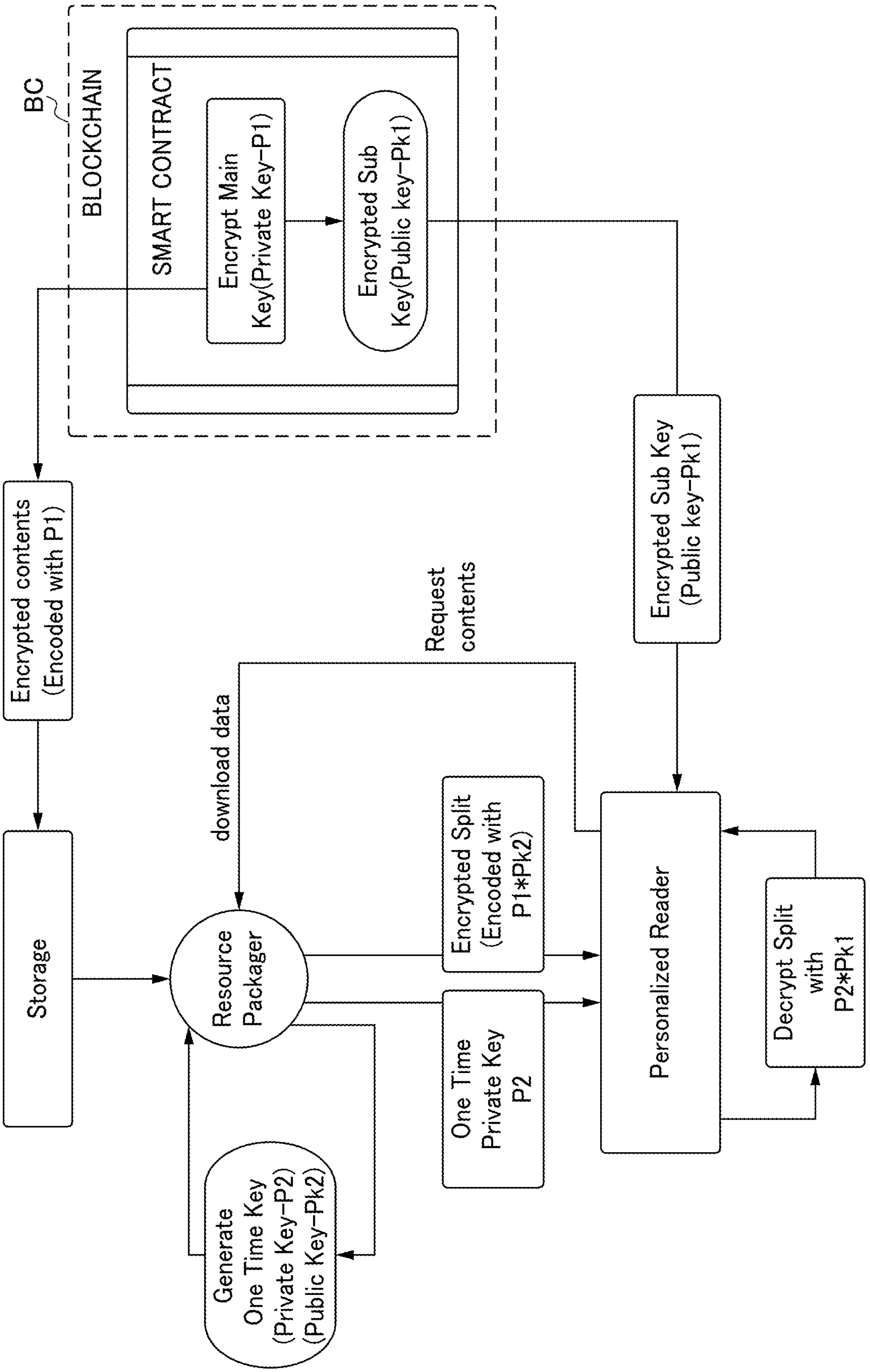
FIG. 27 is a diagram showing an outline of encryption and decryption in the information processing system shown in FIGS. 1 to FIG. 26.

FIG. 27 is a diagram showing an outline of encryption and decryption in the information processing system shown in FIGS. 1 to FIG. 26. That is, in the Smart Contract of the blockchain BC, the content is encrypted using the private key P1 (secret key) and stored in the storage STR. The sub key Pk1 (public key) is provided to the personalized reader (media player MPR). When the content is used using the personalized reader (media player MPR), the resource packager generates the one-time key P2 (secret key) and the corresponding sub key Pk2 (public key). The one-time key P2 is provided to a personalized reader (media player MPR). Then, the resource packager RP decrypts the encrypted content acquired from the storage STR, re-encrypts the encrypted content using the private key P1 and the sub key Pk2, and provides the re-encrypted content to the personalized reader (media player MPR). The personalized reader (media player MPR) can use the content by decrypting the content using the provided one-time key P2 and sub key Pk1.

Figure 28:
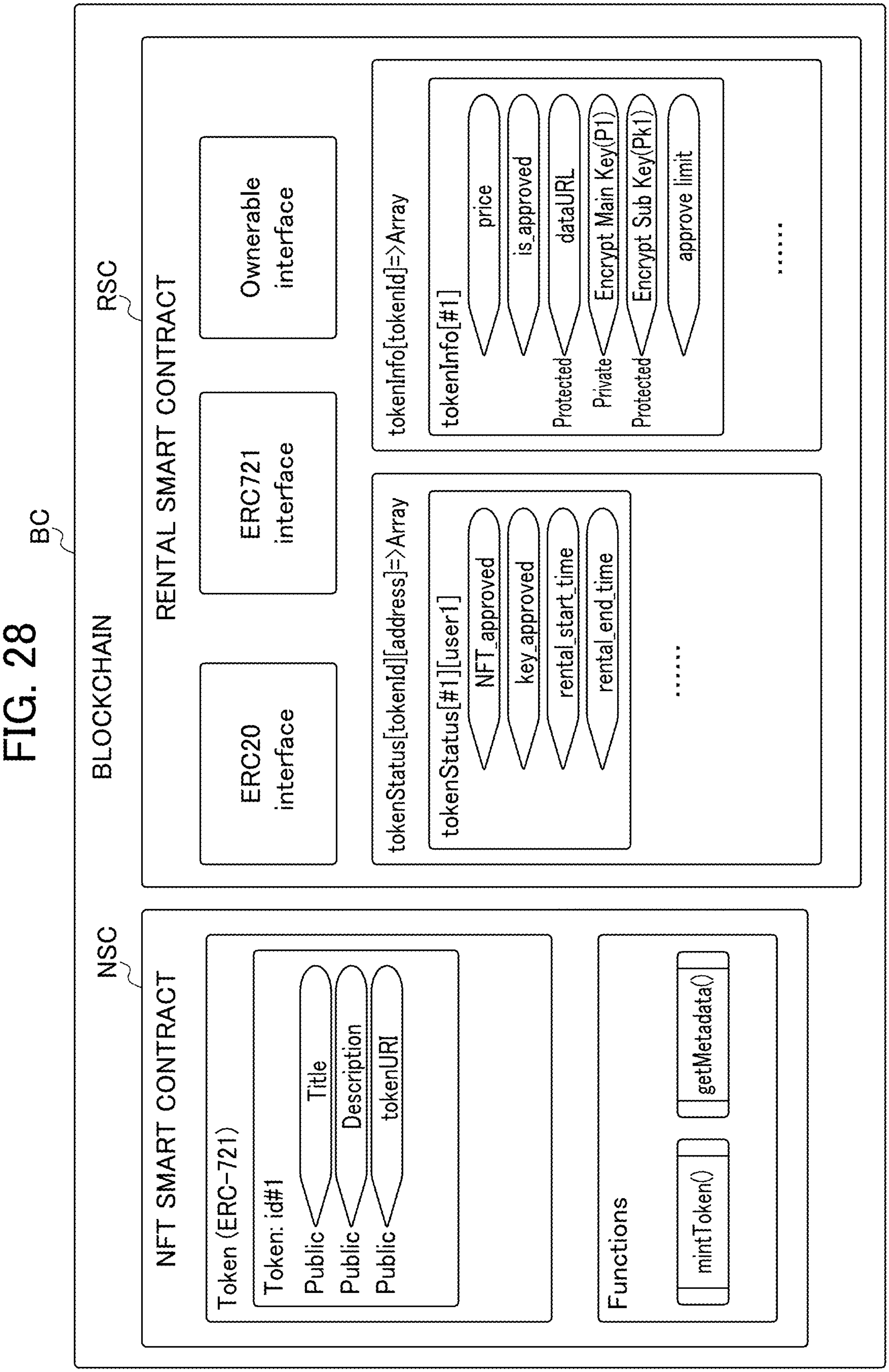
FIG. 28 shows an example of a data structure of the Smart Contract of the NFT without the affiliate program.
Figure 29:
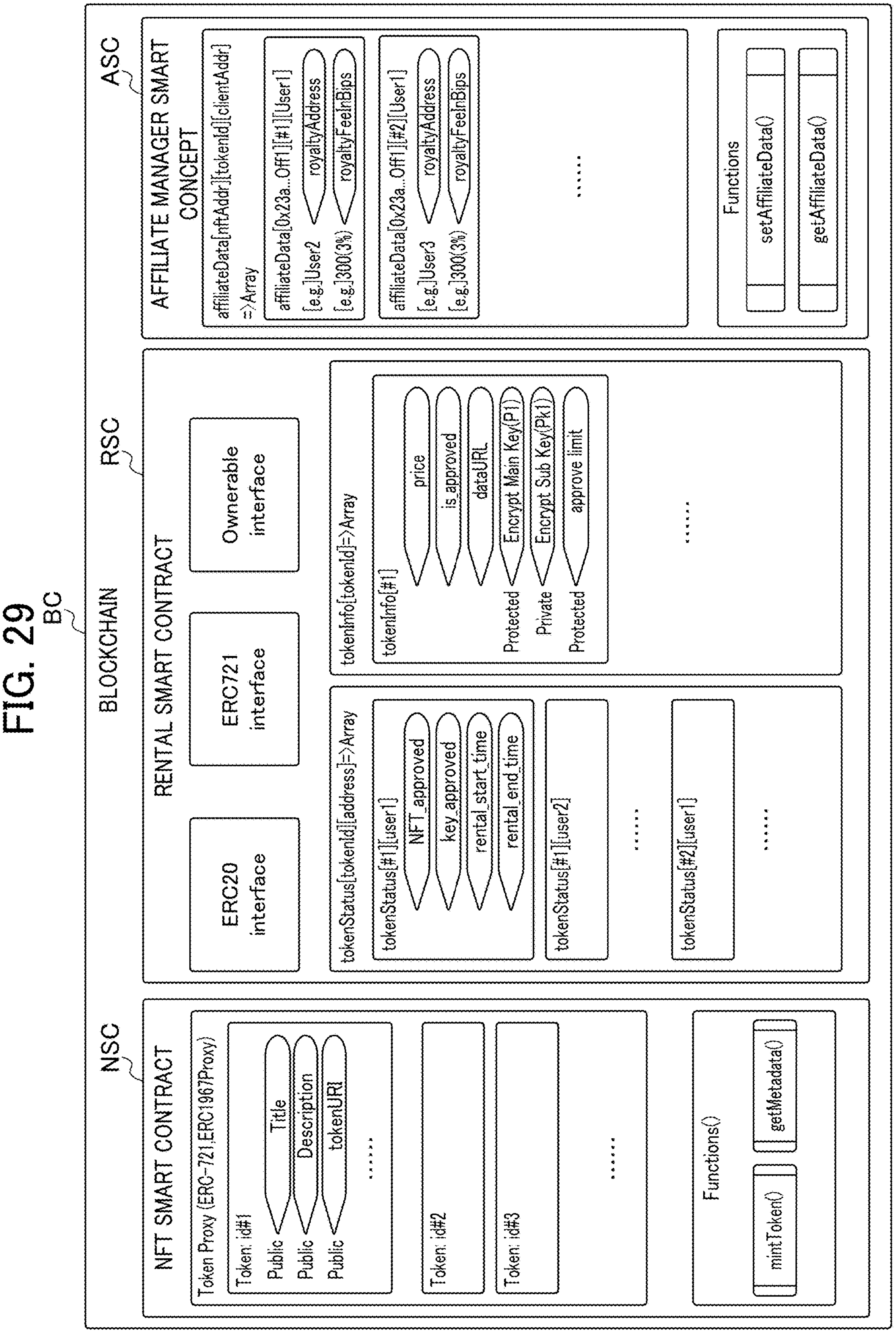
FIG. 29 shows an example of the data structure of the Smart Contract of the NFT with the affiliate program.

FIG. 28 shows an example of the data structure of the Smart Contract of the NFT without the affiliate program. FIG. 29 shows an example of the data structure of the Smart Contract of the NFT with the affiliate program.

That is, when the affiliate program is not involved, as shown in FIG. 28, the NFT Smart Contract NSC and the rental Smart Contract RSC are configured on the blockchain BC. When the affiliate program is involved, as shown in FIG. 29, the affiliate manager Smart Contract ASC is further configured on the blockchain BC in addition to the NFT Smart Contract NSC and the rental Smart Contract RSC. Hereinafter, the NFT Smart Contract NSC, the rental Smart Contract RSC, and the affiliate manager Smart Contract ASC will be described in detail in this order.

The NFT Smart Contract NSC is a Smart Contract for renting content (image, music, moving image, etc.) as a digital asset of a user (owner) in association with the NFT. The NFT Smart Contract NSC is created in the Solidity language so that it can be executed on the Smart Contract Runtime base (hereinafter referred to as "EVM base") of Ethereum (registered trademark). The NFT Smart Contract NSC should be able to tokenize the NFT indicating the user's asset and needs to have a function of transmitting the corresponding token. In addition, it should be designed so that rights can be transferred to a specific Smart Contract for rental of contents (digital assets) associated with the NFT.

The NFT is created based on ERC721 protocol of Ethereum (registered trademark) and metadata is stored as a URL in a specific data server.

Components of the NFT Smart Contract NSC include "token URI", "token Approvals", "safeTransferFrom", "safeMint", "Approve", and "Freeze". The "token URI" is an array for storing URIs of metadata of NFT (token). The "token Approvals" is an array for storing the right transfer status of the NFT (token). The "safeTransferFrom" is a mathematical function for transferring NFT (token) from the owner (current owner) to another user. The "safeMint" is a mathematical function for mintting NFT (token). The "Approve" is a mathematical function for advancing transfer of rights to NFT (token). The "Freeze" is a mathematical function for canceling the transfer of NFT (token).

When the NFT Smart Contract NSC needs to be updated, when a new Smart Contract is deployed, the token material and the past history (mint history, transfer history, etc.) are all deleted. To prevent this, a mathematical function may be updated or a new mathematical function may be added, while storing past materials using an ERC1967Proxy updateable Smart Contract. Also, the ERC2981 protocol can be used to design so as to pay royalty to the creator that created the NFT during the primary and secondary distribution of the NFT. It is also possible to implement the Gasless transaction function using ERC2771 Context and Minimal Forwarder. Here, the Gasless transaction is a transaction for allowing the Smart Contract administrator, not the user, to pay the Gas price generated when the user executes some operation on the Smart Contract, that is, a transaction for preventing the user from paying the Gas price at all. In addition, a blockchain Dapp service such as Morales or Open zeppelin Defender may be used to obtain material that is difficult to obtain directly from the blockchain BC within the HTTP request time. The material that is difficult to obtain from the blockchain BC is, for example, an NFT list owned by the user. On the blockchain BC, information exists which indicates that the owner of the corresponding NFT (token) is a user, and information indicating which NFT (token) the corresponding user has exists in a transaction form for each token. That is, in order to obtain all of the NFT lists owned by a certain user, all transactions occurring in the NFT Smart Contract NSC have to be queried. Such an operation cannot end within the HTTP request time. In order to solve this problem, the present service is provided with the backend 4 (FIG. 1 and FIG. 11) that acquires data related to transactions from the blockchain BC as past data in real time and stores the data in a database, and acquires the corresponding material from the database when the user requests the data. However, as the singulation service and the Dapp service of the blockchain BC are developed, a Dapp providing service such as Morales is generated, and the backend 4 as described above can be easily installed by several mouse clicks.

The details of the NFT Smart Contract NSC have been described above. Next, the rental Smart Contract RSC will be described in detail.

The rental Smart Contract RSC is a Smart Contract for constructing a service (hereinafter referred to as a "rental service") for using the content associated with the NFT. The rental Smart Contract RSC transfers the token (NFT of owner) from the NFT issuer and realizes the rental service. Through the rental Smart Contract RSC, the client that uses (rents) the content associated with the token passes the remittance authority to the relevant rental fee to the rental Smart Contract RSC. When a formal payment relationship is established, the rental Smart Contract RSC pays the rental fee to the owner of the NFT and provides the renter (client) with a key (such as the private key Pk1 described above) capable of browsing the content associated with the token (NFT). The corresponding renter (client) may view the content as the digital asset inside the NFT through the media player MPR (FIG. 1) by using the key. The rental Smart Contract RSC does not transfer the NFT (token) to the renter (client), unlike the conventional general Smart Contract for NFT sales. Instead, the NFT (Token) is stored inside the rental Smart Contract RSC. This is because, after the NFT owner (owner) permits the rental to the renter (client), the risk of the renter (client) losing the NFT (token) or selling to other users is reduced. When the corresponding rental period ends, the rental Smart Contract RSC automatically transfers the stored NFT to its owner, and invalidates a key (such as the private key Pk1) for browsing the content associated with the NFT (token). In addition, the rental Smart Contract RSC provides a mathematical function for determining whether the client has the browsing authority on the media player MPR side. When the affiliate program exists, the rental Smart Contract RSC pays the Referral amount (introduction fee as the affiliate program amount) to the Referral (affiliate program) of the owner of the NFT at the time of paying the rental fee, and pays the remaining amount to the owner of the NFT. The Referral (affiliate program) is paid not in the multi-level system, but rather in the single-level system. That is, it is paid only to the user (client UC1 in the above-described example) who directly introduced him/her (client UC2 in the above-described example).

The components of the rental Smart Contract RSC are as follows. The rental Smart Contract RSC includes rental Information[user address][contract address][token_id]. This is a multidimensional array variable for storing rental information with the address of the renter (client), the NFT contract address, and the token address as Keys. The variable is a multi-dimensional array of a specific structure called Rental Information, and this structure includes a keypair (in the above example, a private key Pk1 and a one-time key Pk2) for browsing an NFT asset (content), [Rental Keypair_], a rental cost [Rental Price_], a date when a rental starts [Rental Start Date], and the date on which the rental ended [Rental End Date]. The rental Smart Contract RSC includes [start Rental]. This is a mathematical function for initiating rental. The NFT owner (owner) and the rental administrator may call to check whether the corresponding rental fee and the right of the NFT (token) are transferred to the rental Smart Contract RSC. When the transfer is confirmed, the rental fee is transferred to the owner of the NFT and the Referral (affiliate program), and the NFT (token) is transferred to the inside of the rental Smart Contract RSC. The rental Smart Contract RSC includes [end Rental]. This is a mathematical function for completing the rental. This mathematical function can be called after the [Rental End Date] has passed and can only be called by the administrator. The rental Smart Contract RSC includes [claimNFT]. This is a mathematical function that the owner of the NFT calls to return its own NFT after [end Rental] is executed. If called before the rental period expires, failure processing is performed. The rental Smart Contract RSC includes [get Rental View Key]. This is a mathematical function for obtaining a key for browsing the content associated with the NFT to which the rental contract has been made. When the rental period expires, the NULL key is automatically sent. The rental Smart Contract RSC includes [get Rental Info]. This is a mathematical function for obtaining detailed information on the rental. This mathematical function can only be called by administrators and renters (clients) and the owner of the NFT.

The rental Smart Contract RSC is basically managed by calling a renter (client) and an owner of the NFT. However, the completion of the rental should be created so as to scan for the completion time point in real time by the administrator from the specific service (such as Moralis and OpenzepplinDefender) or the backend 4 which is uniquely developed, and call the completion time point when the completion is confirmed.

The details of the NFT Smart Contract NSC and the rental Smart Contract RSC have been described above. Next, the affiliate manager Smart Contract ASC will be described in detail.

As described above with reference to FIGS. 1 to FIG. 11, in the present service, an affiliate program is realized which provides a portion of revenue that the user himself/herself can obtain to an introducer (client UC1 in the above-described example) who has introduced his/her own (owner's) NFT (the content associated therewith) to a third party (client UC2 in the above-described example). Therefore, in the present service, the affiliate manager Smart Contract ASC is created. The affiliate manager Smart Contract ASC stores information corresponding to each user. The user (client UC2) of the content associated with the NFT can input the Referral Code of the introducer (UC1) or register with the introduction URL (introduction data) at the time of using the service. At this time, the affiliate manager Smart Contract ASC obtains the address of the introducer (client UC1) from the corresponding Code or the introduction URL, and stores the address as the introducer information of the user. Based on the information described in the affiliate manager Smart Contract ASC, the creator (the owner of the NFT) sets the Royalty information at the time of issuing the token. At the time of rental, the rental Smart Contract RSC reads the Royalty information from the NFT (token) and pays the amount (introduction fee) to the introducer (client UC1). Affiliate transactions that register with the affiliate manager Smart Contract ASC must be made from the wallet of the creator (the owner of the NFT's owner).

The components of the affiliate manager Smart Contract ASC are as follows. The affiliate manager Smart Contract ASC includes [affiliate Information [Creator (owner of NFT) _address]). This is a sequence variable that stores the address and Royalty (percentage) of the introducer (client UC1) using the address of the creator (owner as the owner of the NFT) as a key. The affiliate manager Smart Contract ASC includes [get Affiliate Information (Creator (owner of NFT)_address)]. This is a mathematical function for obtaining the address of the introducer (client UC1) and the Royalty information based on the address of the creator (the owner of the NFT). The affiliate manager Smart Contract ASC includes [register Affiliate] (Creator (the owner of the NFT)_address, referral_address, and referral In Bips). This is a mathematical function for the creator (the owner of the NFT) to store the Referral information at the time of registration.

The NFT of the present service realizes a mechanism of paying Royalty (introduction fee) to an introducer (client UC1) based on ERC2981. Here, an important point is that ERC2981 is only a protocol for storing and instructing payment information of Royalty for each NFT (token). It is not possible to perform some regulatory function (e.g., a function such as shutting down remittance) when ERC 2981 itself does not pay Royalty. It stores only where to send some amount. Therefore, these regulations must be set inside the rental Smart Contract RSC, and the relevant Royalty information setting must be acquired and set from the affiliate manager Smart Contract ASC at the time of Mint of NFT (Token).

Although embodiments of the present invention have been described above, the present invention is not limited to the above-described embodiments, and modifications, improvements, and the like within a range in which the object of the present invention can be achieved are included in the present invention.

For example, in the above-described embodiments, the key is used as a pair of the secret key and the public key, but the algorithm of the key is not particularly limited. Any algorithm key can be used as long as the present service using encryption, decryption, and the like described above can be provided.

For example, the series of processing described above may be executed by hardware or software. In other words, the functional configuration of FIG. 14 is merely an example, and is not particularly limited. That is, it suffices if the information processing apparatus is provided with a function capable of executing the above-described series of processing as a whole, and what kind of functional blocks and what kind of databases are used to realize this function are not particularly limited to the example of FIG. 14. The locations of the functional blocks and the databases are not particularly limited to those in FIG. 14, and may be arbitrary. In addition, one functional block and a database may be configured by hardware alone, may be configured by software alone, or may be configured by a combination thereof.

When the series of processing is executed by software, a program constituting the software is installed in a computer or the like from a network or a recording medium. The computer may be a computer embedded in dedicated hardware. Further, the computer may be a computer capable of executing various functions by installing various programs, for example, a server, a general-purpose smartphone, or a personal computer.

The recording medium including such programs is constituted not only by a removable medium (not shown) distributed separately from the apparatus main body in order to provide the program to the user or the like, but also by a recording medium or the like provided to the user or the like in a state of being incorporated in the apparatus main body in advance.

Note that, in the present specification, the steps describing the program recorded in the recording medium include not only the processing performed in time series along the order, but also the processing performed in parallel or individually without being necessarily performed in time series. In addition, in the present specification, the term "system" indicates an overall apparatus including a plurality of apparatuses, a plurality of means, and the like.

In other words, the information processing system to which the present invention is applied only needs to have the following configuration, and can adopt various embodiments. That is, an information processing system (for example, the information processing system SYS in FIG. 14) to which the present invention is applied is directed to an information processing system that executes control to allow a client (for example, the client UC1 in FIG. 1) to use the content associated with the NFT by a predetermined tool (for example, the media player MPR in FIG. 14) while the owner (for example, the owner UO1 in FIG. 1) owns the NFT on a blockchain (for example, the blockchain BC in FIG. 1 or FIG. 14), and the information processing system includes: a first control unit (for example, the first control unit 51 in FIG. 14) that encrypts the content using a first key (for example, the private key P1), stores the encrypted content in a storage (for example, the storage STR in FIG. 1 or FIG. 14), and stores the first key by a first Smart Contract (for example, the NFT Smart Contract NSC) on the blockchain; a second control unit (for example, the second control unit 52 in FIG. 14) that executes control, according to the first Smart Contract, to set a usage right of the content to the client satisfying a predetermined condition (for example, approval of payment of a rental fee); a third control unit (for example, the third control unit 53 in FIG. 14) that executes control to extract, when the client requests use of the content, the encrypted content from the storage and transmit the encrypted content to the predetermined tool operated by the client; and a fourth control unit (for example, the fourth control unit 54 in FIG. 14) that executes control, according to the first smart contract, to transmit the first key (for example, the sub key Pk1 corresponding to the private key P1) to the predetermined tool operated by the client when it is confirmed that the client has the usage right.

With such a configuration, the content associated with the NFT is encrypted using the first key and recorded in the storage. Then, the usage right of the content is set to the client satisfying the predetermined condition. When it is confirmed that the client has the usage right, since the encrypted content and the first key are provided, the client can browse the content whose encryption has been released. At this time, ownership of the content remains possessed by the owner. As described above, the client satisfying the predetermined condition can use the content without the ownership of the content being transferred. That is, it is possible to improve the convenience of management of rights related to content.

Further, the third control unit can execute control, as the control, when the client requests the use of the content, to acquire the first key from the first Smart Contract, re-encrypt the content extracted from the storage using the first key and the second key (for example, the sub key Pk2 corresponding to the one-time key P2), and transmit the re-encrypted content and the second key (for example, the one-time key P2) to the predetermined tool operated by the client.

Further, the predetermined tool may be a dedicated tool for using the content provided by the control of the first control unit to the fourth control unit by decoding the content with at least the first key.

Further, in order to realize an affiliate program in which the content used by the first client (for example, the client UC1 in FIG. 1) is introduced to the second client (for example, the client UC2 in FIG. 1) and the first client obtains an introduction fee when the second client uses the content, the blockchain further includes the second Smart Contract (for example, the affiliate manager Smart Contract ASC of FIG. 1 or 14) having the information of the first client, and the information processing system further includes: a fifth control unit (for example, the fifth control unit 55 in FIG. 14) that executes control to create introduction data for introducing the content to the second client, transmit the introduction data to the second client, and register the information of the first client in the second smart contract; and a sixth control unit (for example, the sixth control unit in FIG. 14) that executes control, according to the first smart contract, to pay the introduction fee to the first client when the second control unit executes the control to set the usage right of the content to the second client and the information of the first client is acquired from the second smart contract to the first smart contract.

EXPLANATION OF REFERENCE NUMERALS

ASC . . . Affiliate Manager Smart Contract, BC . . . Blockchain, MP . . . Marketplace, MPR . . . Media player, N . . . Network, NSC . . . NFT smart contact, RP . . . Resource packager, RSC . . . Rental Smart Contract, STR . . . Storage, SYS . . . Information processing system, 1 . . . User terminal, 2 . . . Marketplace system, 3 . . . Storage system, 4 . . . Backend, 5 . . . Viewer system, 11 . . . CPU, 12 . . . ROM, 13 . . . RAM, 14 . . . Bus, 15 . . . Input/output interface, 16 . . . Input unit, 17 . . . Output unit, 18 . . . Storage unit, 19 . . . Communication unit, 20 . . . Drive, 30 . . . Removable medium, 51 . . . First Control Unit, 55 . . . Second Control Unit, 53 . . . Third Control Unit, 54 . . . Fourth Control Unit, 55 . . . Fifth Control Unit, 56 . . . Sixth Control Unit

The invention claimed is:

1. An information processing system that executes control to allow a client to use a content associated with an NFT with a predetermined tool while an owner owns the NFT on a blockchain, the system comprising:

a server including a processor coupled to a storage unit which manages a marketplace and is communicably connected to a plurality of computers constituting the blockchain via a network;

wherein the processor is configured to perform a method comprising:

executing a first control to encrypt the content using a first key and to store the content encrypted in a storage, and to store the first key by a first smart contract embedded in the blockchain;

executing a second control that according to the first smart contract, to set a usage right of the content to the client satisfying a predetermined condition;

executing a third control to extract, when the client requests use of the content, the content encrypted from the storage, and to transmit the content encrypted to the predetermined tool operated by the client; and executing a fourth control that, according to the first smart contract, to transmit the first key to the predetermined tool operated by the client, when it is confirmed that the client has the usage right, wherein executing the third control further comprises executing control to acquire the first key from the first smart contract and to re-encrypt the content extracted from the storage using the first key and a second key, when the client requests the use of the content.

2. The information processing system according to claim 1, wherein executing the third control comprises executing control to transmit the re-encrypted content and the second key to the predetermined tool operated by the client when the client requests the use of the content.

3. The information processing system according to claim 1, wherein the predetermined tool is a dedicated tool for decrypting and using the content provided by executing the first control-unit to the fourth control using at least the first key.

4. The information processing system according to claim 1, wherein, in order to realize an affiliate program in which the content used by a first client is introduced to a second client and the first client obtains an introduction fee when the second client uses the content, the blockchain further includes a second smart contract having information of the first client, and wherein the processor is configured to perform the method further comprises:

executing a fifth control to create introduction data for introducing the content to the second client, transmit the introduction data to the second client, and register the information of the first client in the second smart contract; and executing a sixth control that according to the first smart contract, to pay the introduction fee to the first client when executing the second control to set the usage right of the content to the second client and the information of the first client is acquired from the second smart contract to the first smart contract.

5. An information processing method executed by an information processing system that executes control to allow a client to use a content associated with an NFT using a predetermined tool while an owner owns the NFT on a blockchain, the method comprising:

executing a first control to encrypt the content using a first key and to store the content encrypted in a storage, and to store the first key by a first smart contract embedded in the blockchain;

executing a second control that according to the first smart contract, to set a usage right of the content to the client satisfying a predetermined condition;

executing a third control to extract, when the client requests use of the content, the content encrypted from the storage, and to transmit the content encrypted to the predetermined tool operated by the client; and executing a fourth control that according to the first smart contract, to transmit the first key to the predetermined tool operated by the client when it is confirmed that the client has the usage right wherein executing the third control further comprises executing control to acquire the first key from the first smart contract and to re-encrypt the content extracted from the storage using the first key and a second key, when the client requests the use of the content.

6. A non-transitory computer readable medium storing a program that causes a computer including an information processing system that executes control to allow a client to use a content associated with an NFT with a predetermined tool while an owner owns the NFT on a blockchain, to execute control processing including:

executing a first control to encrypt the content using a first key and to store the content encrypted in a storage, and to store the first key by a first smart contract embedded in the blockchain;

executing a second control that according to the first smart contract, to set a usage right of the content to the client satisfying a predetermined condition;

executing a third control to extract, when the client requests use of the content, the content encrypted from the storage, and to transmit the content encrypted to the predetermined tool operated by the client; and executing a fourth control that according to the first smart contract, to transmit the first key to the predetermined tool operated by the client when it is confirmed that the client has the usage right wherein executing the third control further comprises executing control to acquire the first key from the first smart contract and to re-encrypt the content extracted from the storage using the first key and a second key, when the client requests the use of the content.

* * * * *